US010539830B2

(12) United States Patent
Song et al.

(10) Patent No.: US 10,539,830 B2
(45) Date of Patent: Jan. 21, 2020

(54) CURVED DISPLAY DEVICE INCLUDING ALIGNMENT LAYER AND METHOD OF MANUFACTURING THE SAME

(71) Applicant: Samsung Display Co., Ltd., Yongin, Gyeonggi-Do (KR)

(72) Inventors: Donghan Song, Yongin-si (KR); Hokil Oh, Yongin-si (KR); Su Jeong Kim, Seoul (KR); Kichul Shin, Seongnam-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 226 days.

(21) Appl. No.: 14/755,081

(22) Filed: Jun. 30, 2015

(65) Prior Publication Data

US 2015/0378193 A1 Dec. 31, 2015

(30) Foreign Application Priority Data

Jun. 30, 2014 (KR) .................. 10-2014-0080921
May 4, 2015 (KR) .................. 10-2015-0062685

(51) Int. Cl.
*G02F 1/1337* (2006.01)

(52) U.S. Cl.
CPC ...... *G02F 1/1337* (2013.01); *G02F 1/133788* (2013.01); *G02F 2001/133726* (2013.01); *G02F 2001/133746* (2013.01)

(58) Field of Classification Search
CPC combination set(s) only.
See application file for complete search history.

(56) References Cited

U.S. PATENT DOCUMENTS 6,512,569 B1 * 1/2003 Acosta ............. G02F 1/133753
349/129
6,583,835 B1 * 6/2003 Yoshida ............ G02F 1/133753
349/124

(Continued)

FOREIGN PATENT DOCUMENTS

CN 102213872 A 10/2011
KR 1020100084823 A 7/2010

(Continued)

OTHER PUBLICATIONS

Chinese Office Action for Application No. 201510373042.4 dated Nov. 6, 2019 enumerating the above references listed in the Chinese Office Action.

*Primary Examiner* — Lauren Nguyen
(74) *Attorney, Agent, or Firm* — Cantor Colburn LLP

(57) ABSTRACT

A curved display device includes a curved first substrate, a curved second substrate, a liquid crystal layer, a first alignment layer, and a second alignment layer. The second substrate faces the first substrate. The liquid crystal layer is interposed between the first and second substrates and includes liquid crystal molecules. The first alignment layer includes reactive mesogens polymerized to each other and is disposed between the first substrate and the liquid crystal layer. The second alignment layer is disposed between the second substrate and the liquid crystal layer. Among the liquid crystal molecules, first liquid crystal molecules disposed in the vicinity of the first alignment layer have a first pretilt angle, and second liquid crystal molecules disposed in the vicinity of the second alignment layer have a second pretilt angle different from the first pretilt angle.

37 Claims, 21 Drawing Sheets

(56) References Cited

U.S. PATENT DOCUMENTS

| | | | |
|---|---|---|---|
| 9,057,917 B2 | 6/2015 | Choi et al. | |
| 2003/0048401 A1* | 3/2003 | Hanaoka | G02F 1/133753 349/123 |
| 2009/0141215 A1* | 6/2009 | Bremer | C07C 39/367 349/86 |
| 2011/0025967 A1 | 2/2011 | Sohn et al. | |
| 2011/0134382 A1 | 6/2011 | Miyakawa et al. | |
| 2011/0157531 A1 | 6/2011 | Suwa et al. | |
| 2012/0044618 A1* | 2/2012 | Lee | 361/679.01 |
| 2012/0218500 A1 | 8/2012 | Nakamura et al. | |
| 2012/0282838 A1* | 11/2012 | Kim | G02F 1/133753 445/25 |
| 2014/0176856 A1 | 6/2014 | Lee et al. | |

FOREIGN PATENT DOCUMENTS

| | | |
|---|---|---|
| KR | 1020110117439 A | 10/2011 |
| KR | 1020130077235 A | 7/2013 |
| KR | 1020130078065 A | 7/2013 |
| KR | 1020130087491 A | 8/2013 |
| KR | 1020150004140 A | 1/2015 |
| KR | 1020150005000 A | 1/2015 |
| KR | 1020150012093 A | 2/2015 |

* cited by examiner

CURVED DISPLAY DEVICE INCLUDING ALIGNMENT LAYER AND METHOD OF MANUFACTURING THE SAME

This application claims priority to Korean Patent Application No. 10-2014-0080921, filed on Jun. 30, 2014, and Korean Patent Application No. 10-2015-0062685, filed on May 4, 2015, the contents of which in their entirety are herein incorporated by reference.

BACKGROUND

1. Field of Disclosure

The present disclosure relates to a curved display device including an alignment layer to align liquid crystal molecules and a method of manufacturing the curved display device.

2. Description of the Related Art

In general, a liquid crystal display device is classified into a twisted nematic mode liquid crystal display device, a horizontal electric field mode liquid crystal display device, or a vertical alignment mode liquid crystal display device.

In the vertical alignment mode liquid crystal display device, liquid crystal molecules of a liquid crystal layer are aligned in a predetermined direction when no electric field is applied to the liquid crystal layer to allow a long axis of the liquid crystal molecules to be aligned vertical to a substrate. Accordingly, a viewing angle of the vertical alignment mode liquid crystal display device becomes wider and a contrast ratio of the vertical alignment mode liquid crystal display device increases.

To align the liquid crystal molecules in the predetermined direction, a rubbing method and an optical rubbing method are widely used. The liquid crystal molecules of the vertical alignment mode liquid crystal display device are aligned in the predetermined direction using a reactive mesogen.

SUMMARY

The present disclosure provides a curved display device having improved display quality.

The present disclosure provides a method of manufacturing the curved display device having improved display quality.

In exemplary embodiments, a method of manufacturing a curved display device is provided. The curved display device is manufactured by providing a first alignment solution on a first base substrate, curing the first alignment solution to form a first base layer, providing a second alignment solution on a second base substrate, curing the second alignment solution to form a second base layer, providing a liquid crystal layer between the first base substrate and the second base substrate, applying an electric field to the liquid crystal layer, and applying a first light to the liquid crystal layer to allow the reactive mesogens to react, and forming a first alignment forming layer on the first base layer. The first alignment solution includes a first alignment agent and a photo-initiator, the second alignment solution includes a second alignment agent and does not include the photo-initiator, and the liquid crystal layer includes a liquid crystal composition containing reactive mesogens.

In an exemplary embodiment, the photo-initiator is present in an amount of about 0.001 parts by weight to about 20 parts by weight per 100 parts by weight of the alignment agent.

In an exemplary embodiment, the photo-initiator includes at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro-acetophenone, α-chorothioxanthone, benzoin alkylether, and derivatives thereof.

In an exemplary embodiment, each of the reactive mesogens includes at least one of acrylate, methacrylate, epoxy, oxetane, vinyl ether, and styrene.

In an exemplary embodiment, the applying of the electric field is performed substantially simultaneously with the forming of the first alignment forming layer on the first base layer.

In exemplary embodiments, of a curved display device includes a first base substrate, a second base substrate facing the first base substrate, a pixel electrode disposed on the first base substrate, a common electrode disposed on the first base substrate or the second base substrate, a first base layer disposed on the first base substrate, a first alignment forming layer disposed only on the first base layer and including reactive mesogens, a second base layer disposed on the second base substrate, and a liquid crystal layer disposed between the first alignment forming layer and the second base layer, the liquid crystal layer including liquid crystal molecules.

In an exemplary embodiment, the reactive mesogens include at least one of acrylate, methacrylate, epoxy, oxetane, vinyl ether, and styrene.

In an exemplary embodiment, the first alignment forming layer further includes a photo-initiator and derivatives thereof bonded to the reactive mesogen.

In an exemplary embodiment, the photo-initiator and the derivatives of the photo-initiator include at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro acetophenone, α-chloro-thioxanthone, benzoin alkylether, and derivatives thereof.

In exemplary embodiments, the first and second base substrates are curved.

In exemplary embodiments, a curved display device includes a curved first substrate, a curved second substrate, a liquid crystal layer, a first alignment layer, and a second alignment layer. The second substrate faces the first substrate. The liquid crystal layer is interposed between the first and second substrates and includes liquid crystal molecules. The first alignment layer includes reactive mesogens polymerized to each other and is disposed between the first substrate and the liquid crystal layer. The second alignment layer is disposed between the second substrate and the liquid crystal layer. Among the liquid crystal molecules, first liquid crystal molecules disposed in the vicinity of the first alignment layer have a first pretilt angle, and second liquid crystal molecules disposed in the vicinity of the second alignment layer have a second pretilt angle different from the first pretilt angle.

In an exemplary embodiment, the first pretilt angle is about 80 degrees to about 90 degrees.

In an exemplary embodiment, the second pretilt angle is about 88 degrees to about 90 degrees.

In an exemplary embodiment, the first alignment layer includes a first base layer and a first alignment forming layer. The first base layer is disposed on the first substrate. The first alignment forming layer is disposed on the first base layer and includes the polymerized reactive mesogens. The first substrate has a first radius of curvature and the second substrate has a second radius of curvature which is different from the first radius of curvature.

In an exemplary embodiment, the first substrate includes a first base substrate and a pixel electrode disposed on the first base substrate, and the second substrate includes a second base substrate and a common electrode disposed on the second substrate to face the pixel electrode.

In an exemplary embodiment, the pixel electrode includes a trunk portion and a plurality of branch portions extending from the trunk portion.

In an exemplary embodiment, the curved display device further includes at least one pixel electrode including a plurality of domains separated from each other by the trunk portion.

In an exemplary embodiment, the branch portions in each domain extend in a direction substantially parallel to each other, and extend in different directions according to the domains.

In an exemplary embodiment, the plurality of domains includes a first domain, a second domain, a third domain, and a fourth domain.

In an exemplary embodiment, the curved display device further includes a first polarizing plate and a second polarizing plate. The first polarizing plate is disposed under the first substrate and has a first transmission axis. The second polarizing plate is disposed above the second substrate and has a second transmission axis. The first transmission axis is substantially perpendicular to the second transmission axis.

In exemplary embodiments, a curved display device includes a curved first base substrate, a first alignment layer, a curved second base substrate, and a second alignment layer. The first alignment layer includes a first base layer disposed on the first base substrate and a plurality of first protrusions disposed on the first base layer. The second base substrate faces the first substrate. The second alignment layer includes a second base layer disposed on the second base substrate and a plurality of second protrusions disposed on the second base layer. The first protrusions include first large-size protrusions each having a particle size equal to or greater than about 30 nanometers (nm) and equal to or less than about 1000 nm in diameter. The second protrusions include second large-size protrusions each having a particle size equal to or greater than about 30 nm and equal to or smaller than about 1000 nm in diameter. The first base layer includes a first overlap area overlapped with the first large-size protrusions and a first non-overlap area not overlapped with the first large-size protrusions. The second base layer includes a second overlap area overlapped with the second large-size protrusions and a second non-overlap area not overlapped with the second large-size protrusions. The first and second overlap areas satisfy Equation 1.

$$0 < \text{area of the second overlap area}/\text{area of the first overlap area} \leq 4/5. \quad \text{Equation 1}$$

In an exemplary embodiment, the number of the second large-size protrusions is smaller than a number of the first large-size protrusions.

In an exemplary embodiment, the area of the second overlap area is smaller than an area of the second non-overlap area.

The second overlap area and the second non-overlap area satisfy Equation 2.

$$0 < \text{area of the second overlap area}/\text{area of the second non-overlap area} \leq 5/10. \quad \text{Equation 2}$$

In an exemplary embodiment, the area of the first overlap area is equal to or greater than about $3.0 \times 10^5$ nm$^2$ and equal to or less than about $1.0 \times 10^6$ nm$^2$ and a unit area of a surface of the first base layer is about $1.0 \times 10^6$ nm$^2$.

In an exemplary embodiment, the area of the second overlap area exceeds 0 nm$^2$ and is equal to or less than about $3.5 \times 10^5$ nm$^2$ and a unit area of a surface of the second base layer is about $1.0 \times 10^6$ nm$^2$.

In exemplary embodiments, a curved display device includes a curved first base substrate, a first alignment layer, a curved second base substrate, and a second alignment layer. The first alignment layer includes a first base layer disposed on the first base substrate and a plurality of first protrusions disposed on the first base layer. The second base substrate faces the first substrate. The second alignment layer includes a second base layer disposed on the second base substrate and a plurality of second protrusions disposed on the second base layer. The first protrusions include first large-size protrusions each having a size equal to or greater than about 50 nm and equal to or smaller than about 1000 nm in diameter. The second protrusions include second large-size protrusions each having a particle size equal to or greater than about 50 nm and equal to or smaller than about 1000 nm in diameter. The first base layer includes a first overlap area overlapped with the first large-size protrusions and a first non-overlap area not overlapped with the first large-size protrusions. The second base layer includes a second overlap area overlapped with the second large-size protrusions and a second non-overlap area not overlapped with the second large-size protrusions. The first and second overlap areas satisfy Equation 3.

$$0 < \text{area of the second overlap area}/\text{area of the first overlap area} \leq 1/2 \quad \text{Equation 3}$$

In an exemplary embodiment, the number of the second large-size protrusions is less than the number of the first large-size protrusions.

In an exemplary embodiment, the second overlap area and the second non-overlap area satisfy following Equation 4.

$$0 < \text{area of the second overlap area}/\text{area of the second non-overlap area} \leq 1/10 \quad \text{Equation 4}$$

In an exemplary embodiment, the area of the first overlap area is equal to or greater than about $0.4 \times 10^6$ nm$^2$ and equal to or less than about $1.0 \times 10^6$ nm$^2$ and the unit area of a surface of the first base layer is about $1.0 \times 10^6$ nm$^2$.

In an exemplary embodiment, the area of the second overlap area is greater than 0 nm$^2$ and equal to or less than about $0.3 \times 10^5$ nm$^2$ and a unit are of a surface of the second based layer is about $1.0 \times 10^6$ nm$^2$.

In exemplary embodiments, a curved display device includes a curved first substrate, a first alignment layer, a curved second substrate, and a second alignment layer. The first alignment layer is disposed on the first substrate and includes a photo-initiator. The second substrate faces the first substrate. The second alignment layer is disposed on the second substrate to face the first alignment layer. The first alignment layer includes a first base layer, a photo-initiator, and reactive mesogens polymerized each other.

In an exemplary embodiment, the second alignment layer is not polymerized to the photo-initiator.

In an exemplary embodiment, the photo-initiator includes at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro-acetophenone, α-chloro-thioxanthone, benzoin alkylether, and derivatives thereof.

In an exemplary embodiment, each of the reactive mesogens includes at least one of acrylate, methacrylate, epoxy, oxetane, vinyl ether, styrene, and derivatives thereof.
In an exemplary embodiment, the first alignment layer includes at least one compound having a structure represented by following Chemical formulas 1 and 2.
Chemical formula 1
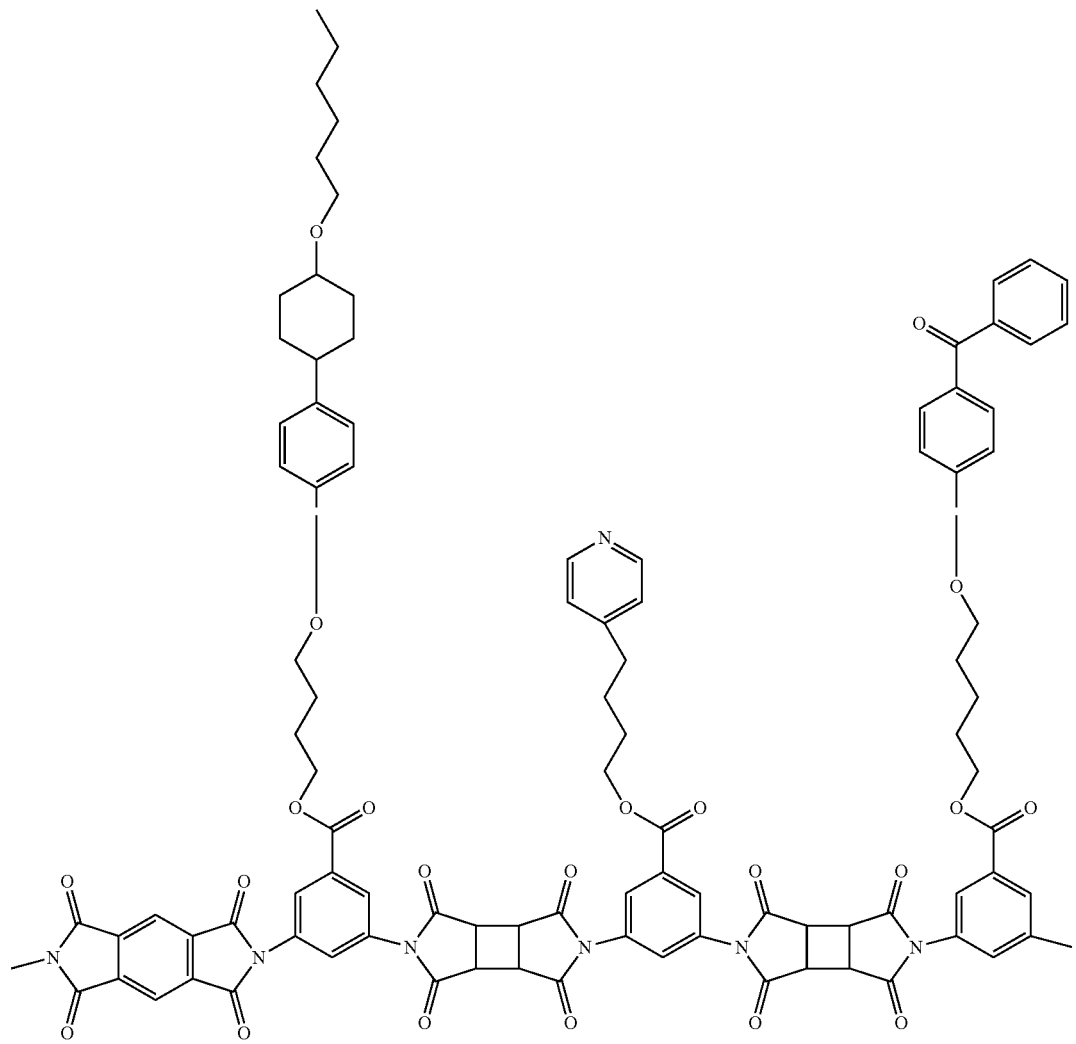
Chemical formula 2

-continued

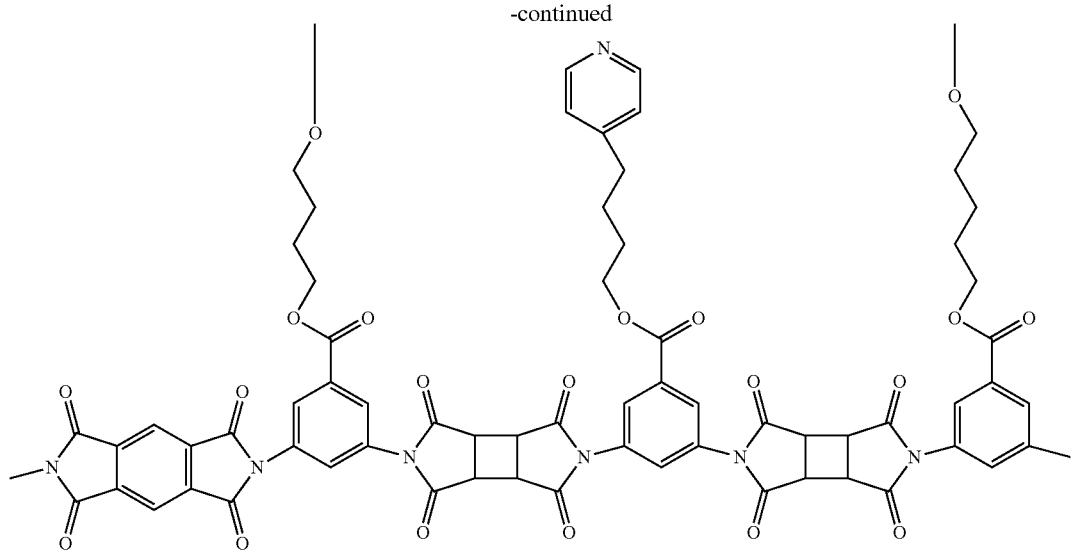

In an exemplary embodiment, the compound having a structure represented by Chemical formula 1 is present on a surface of the first alignment layer in an amount greater than a compound having the structure represented by the Chemical formula 2.

According to the above, exemplary embodiments of the curved display device may have improved display quality.

In addition, exemplary embodiments of the curved display device having improved display quality may be manufactured through the manufacturing method.

BRIEF DESCRIPTION OF THE DRAWINGS

The above and other advantages of the present disclosure will become readily apparent by describing in further detail exemplary embodiments thereof with reference to the accompanying drawings, wherein.

DETAILED DESCRIPTION

Figure 1A:
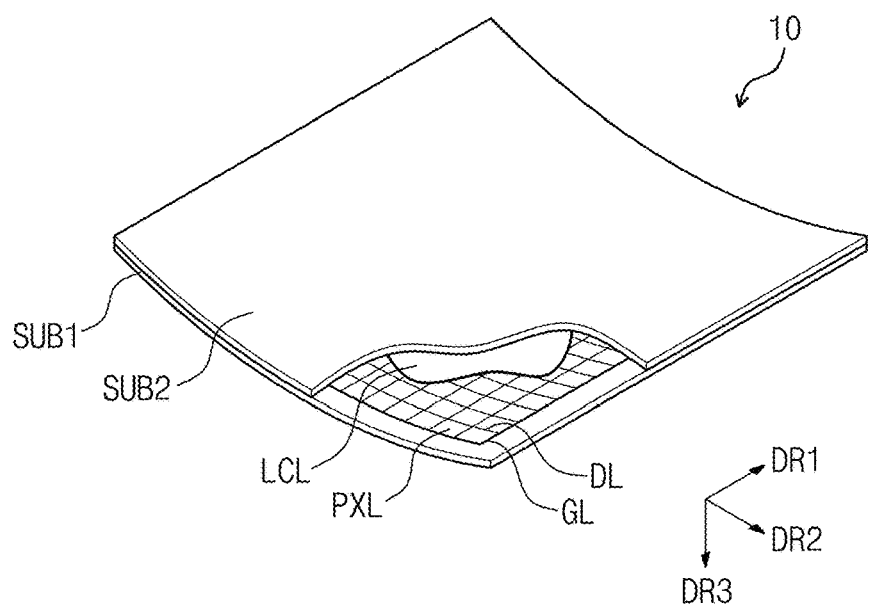
FIGS. 1A and 1B are perspective views showing an exemplary embodiment of a curved display device according to the present disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the present invention will be explained in detail with reference to the accompanying drawings.

Figure 1B:
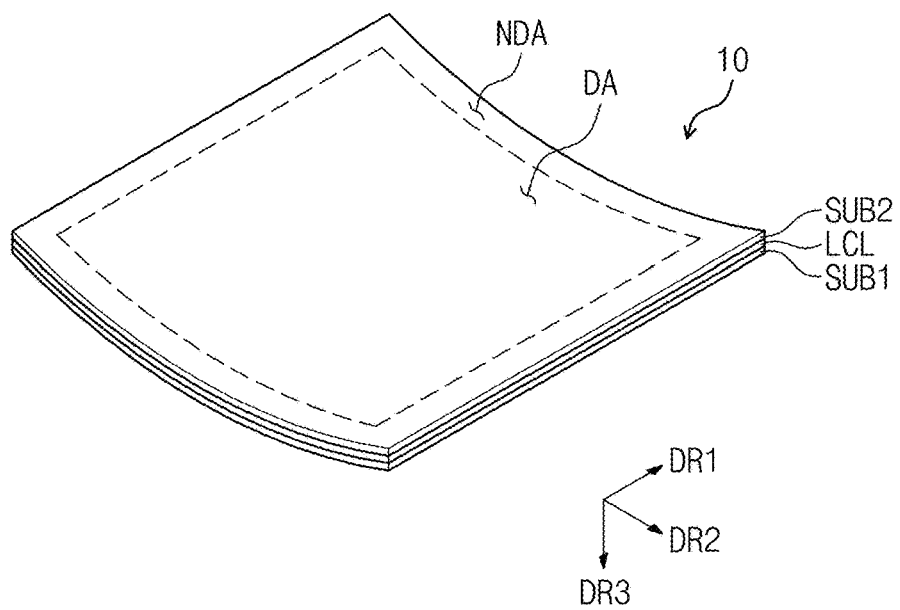
Figure 2:
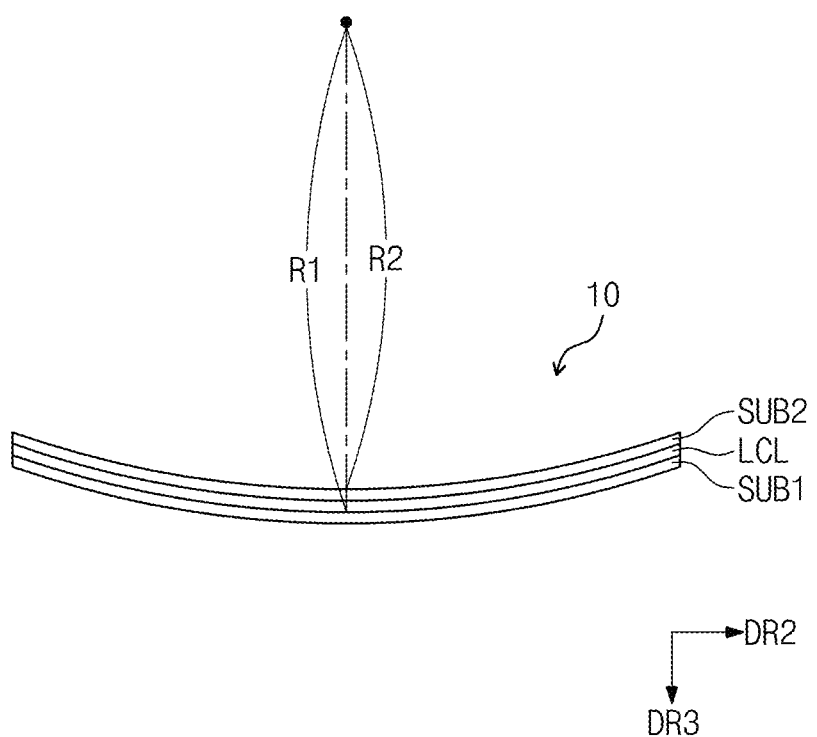
FIG. 2 is a cross-sectional view showing an exemplary embodiment of a curved display device according to the present disclosure.

FIG. 1A is a perspective view showing an exemplary embodiment of a curved display device 10 according to the present disclosure, and FIG. 1B is also a perspective view showing an exemplary embodiment of the curved display device 10 according to the present disclosure. FIG. 2 is a cross-sectional view showing an exemplary embodiment of the curved display device 10 according to the present disclosure.

Referring to FIGS. 1A, 1B, and FIG. 2, the curved display device 10 includes a first substrate SUB1, a second substrate SUB2, and a liquid crystal layer LCL. The liquid crystal layer LCL is disposed between the first and second substrates SUB1 and SUB2.

The curved display device 10 displays an image. The curved display device 10 includes a display area DA displaying the image and a non-display area NDA not displaying the image.

When viewed in a thickness direction DR3 of the curved display device 10, the display area DA has a substantially rectangular shape, but the shape of the display area DA is not limited to the rectangular shape. The thickness direction DR3 may be a front direction of the curved display device 10 as observed from the viewpoint of a user.

The display area DA includes a plurality of pixel areas PXL. The pixel areas PXL are defined by a plurality of gate lines GL and a plurality of data lines DL. The pixel areas PXL are arranged in a matrix form. Each pixel area PXL includes a pixel PX (refer to FIG. 3).

When viewed in the thickness direction DR3 of the curved display device 10, the non-display area NDA surrounds the display area DA. The non-display area NDA is adjacent to the display area DA in a first direction DR1 and in a second direction DR2 substantially vertical to the first direction DR1.

The curved display device 10 is curved at a predetermined curvature/radius of curvature. The curved display device 10 is flexible or rigid.

The curved display device 10 has a concave curvature when the user sees the curved display device 10. When the user recognizes the image displayed in the curved display device 10, the user is provided with an improved three-dimensional effect, a sense of immersion (or immersiveness), and presence. In FIGS. 1A and 1B, the curved display device 10 has the concave shape when viewed in the thickness direction DR3 of the curved display device 10, but is not limited thereto or thereby. That is, the curved display device 10 may have a convex shape when viewed in the first direction DR1 or the second direction DR2 of the curved display device 10. The user may recognize the image displayed on the curved surface of the curved display device 10.

The first substrate SUB1 may be curved to have a first radius of curvature R1. The second substrate SUB2 may be curved to have a second radius of curvature R2.

Figure 3:
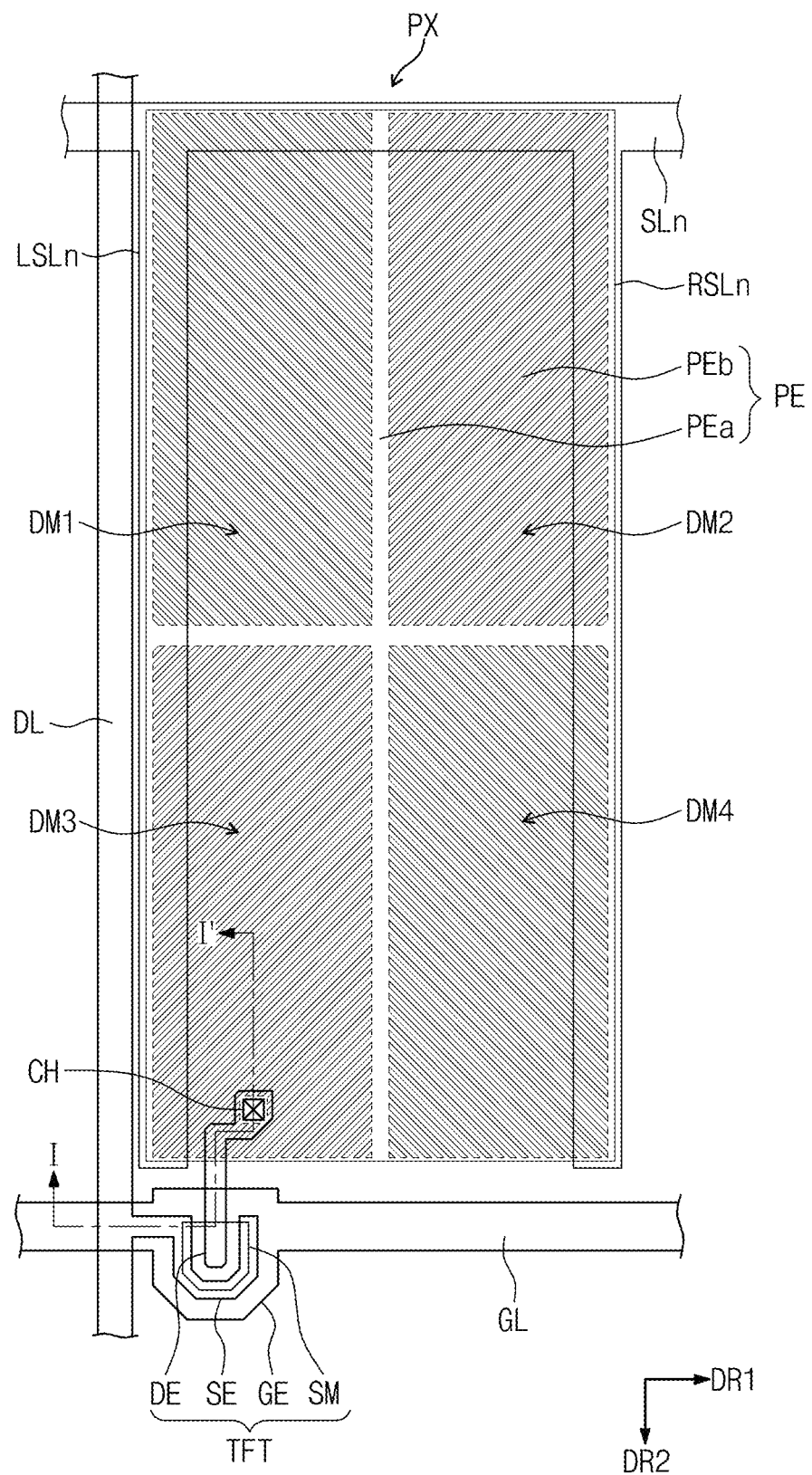
FIG. 3 is a plan view showing one pixel of a plurality of pixels included in an exemplary embodiment of a curved display device according to the present disclosure.
Figure 4:
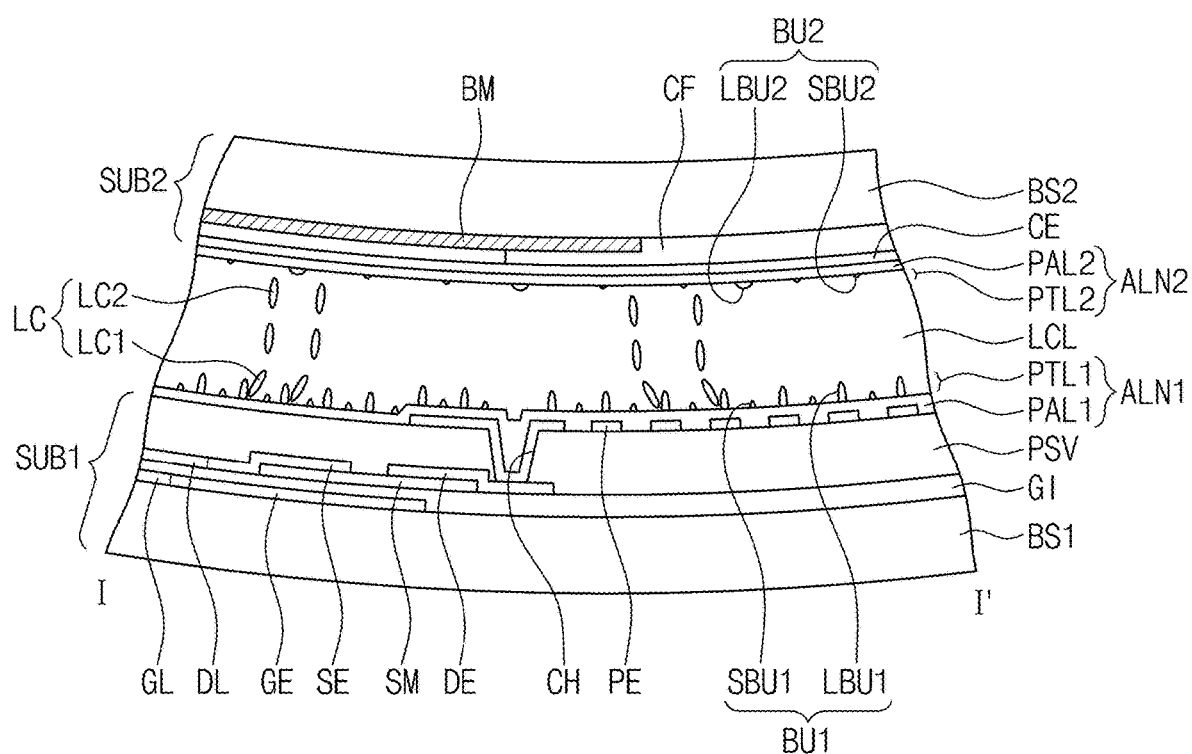
FIG. 4 is a cross-sectional view taken along a line I-I' of FIG. 3.

FIG. 3 is a plan view showing one pixel PX of a plurality of pixels included in a an exemplary embodiment of a curved display device according to the present disclosure, and FIG. 4 is a cross-sectional view taken along line I-I' of FIG. 3. In an exemplary embodiment, the plurality of pixels have the same structure and function, however for the convenience of explanation, only one pixel will be described in detail.

Referring to FIGS. 1A, 1B, and FIGS. 2 to 4, the curved display device 10 includes the first substrate SUB1, a first alignment layer ALN1 disposed on the first substrate SUB1, a second substrate SUB2 facing the first substrate SUB1, a second alignment layer ALN2 disposed on the second substrate SUB2, and the liquid crystal layer LCL interposed between the first and second alignment layers ALN1 and ALN2.

The first substrate SUB1 includes a first base substrate BS1, a plurality of gate lines GL, a plurality of data lines DL, and a plurality of pixel areas PXL.

The first base substrate BS1 may be a polymer substrate, a plastic substrate, a glass substrate, or a quartz substrate. The first base substrate BS1 is a transparent insulating substrate. The first base substrate BS1 is flexible or rigid.

For the convenience of explanation, FIGS. 2 and 3 show one pixel connected to one gate line of the gate lines GL and one data line of the data lines DL, but the pixel is not limited thereto or thereby. That is, one gate line and one data line may be connected to plural pixels or plural gate lines and plural data lines may be connected to one pixel.

The gate lines GL are disposed on the first base substrate BS1 and extend in the first direction DR1. The data lines DL extend in the second direction DR2 crossing the first direction DR1 such that the gate insulating layer GI is disposed between the gate lines GL and the data lines DL. The gate insulating layer GI is disposed on an entire surface of the base substrate BS1 to cover the gate lines GL.

Each pixel PX includes a thin film transistor TFT, a pixel electrode PE connected to the thin film transistor TFT, and a storage electrode part. The thin film transistor TFT includes a gate electrode GE, the gate insulating layer GI, a semiconductor pattern SM, a source electrode SE, and a drain electrode DE. The storage electrode part includes a storage line SLn extending in the first direction D1 and first and second branch electrodes LSLn and RSLn, which are branched from the storage line SLn and extend in the second direction D2.

The gate electrode GE is protruded from the gate line GL or formed on a portion of the gate line GL. The gate electrode GE includes a metal material. The gate electrode GE may be formed of a metal material including at least one of nickel, chromium, molybdenum, aluminum, titanium, copper, tungsten, and an alloy thereof. The gate electrode GE has a single-layer structure or a multi-layer structure. For instance, the gate electrode GE may have a triple-layer structure of molybdenum, aluminum, and molybdenum, which are sequentially stacked, or a double-layer structure of titanium and copper, which are sequentially stacked.

The semiconductor pattern SM is disposed on the gate insulating layer GI. The semiconductor pattern SM is disposed on the gate electrode GE such that the gate insulating layer GI is disposed between the semiconductor pattern SM and the gate electrode GE. The semiconductor pattern SM is partially overlapped with the gate electrode GE. The semiconductor pattern SM includes an active pattern (not shown) disposed on the gate insulating layer GI and an ohmic contact layer (not shown) disposed on the active pattern. The active pattern includes an amorphous silicon thin layer and the ohmic contact layer includes an n+ amorphous silicon layer. The ohmic contact layer allows the source and drain electrodes SE and DE to ohmic contact with the active pattern.

The source electrode SE is branched from the data line DL. The source electrode SE is disposed on the ohmic contact layer and is partially overlapped with the gate electrode GE.

The drain electrode DE is spaced apart from the source electrode SE such that the semiconductor pattern SM is disposed between the drain electrode DE and the source electrode SE when viewed in a plan view. The drain electrode DE is disposed on the ohmic contact layer and is partially overlapped with the gate electrode GE.

The source electrode SE and the drain electrode DE are formed of a metal including at least one of nickel, chromium, molybdenum, aluminum, titanium, copper, tungsten, and an alloy thereof. The source electrode SE and the drain electrode DE have a single-layer structure or a multi-layer structure composed of the above-mentioned metal materials. For instance, the source electrode SE and the drain electrode DE may have a double-layer structure of titanium and copper, which are sequentially stacked, or a single-layer structure of the alloy of titanium and copper.

Accordingly, an upper surface of the active pattern is exposed through between the source electrode SE and the drain electrode DE, and the active pattern serves as a channel part, e.g., a conductive channel, between the source electrode SE and the drain electrode DE. The source electrode SE and the drain electrode DE are overlapped with the semiconductor pattern SM in areas except for the channel part between the source electrode SE and the drain electrode DE.

The pixel electrode PE is connected to the drain electrode DE after passing through a protective layer PSV disposed between the pixel electrode PE and the drain electrode DE. The pixel electrode PE is partially overlapped with the storage line SLn and the first and second branch electrodes LSLn and RSLn to form a storage capacitor.

The protective layer PSV covers the source electrode SE, the drain electrode DE, the channel part, and the gate insulating layer GI. The protective layer PSV includes a contact hole CH defined therein which exposes a portion of the drain electrode DE. The protective layer PSV is formed of a material which includes silicon nitride or silicon oxide.

The pixel electrode PE is connected to the drain electrode DE through the contact hole CH formed in the protective layer PSV. The pixel electrode PE is formed of transparent conductive oxide, e.g., indium tin oxide ("ITO"), indium zinc oxide ("IZO"), indium tin zinc oxide ("ITZO"), etc.

The pixel electrode PE includes a trunk portion PEa and a plurality of branch portions PEb extending from the trunk portion in a radial form. The trunk portion PEa or a part of the branch portions PEb are connected to the drain electrode DE through the contact hole CH.

The trunk portion PEa may have various shapes. In an exemplary embodiment, the trunk portion PEa has a cross shape as shown in FIG. 3. The branch portions PEb are spaced apart from each other to prevent the branch portions PEb from making contact with each other and extend substantially in parallel to each other in areas divided by the trunk portion PEa. The branch portions PEb, which are adjacent to each other, are spaced apart from each other in terms of micrometers in distance. This is to facilitate the alignment of liquid crystal molecules of the liquid crystal layer LCL to a specific azimuth on a plane parallel to the first base substrate BS1.

Each pixel PX is divided into plural domains DM1, DM2, DM3, and DM4 by the trunk portion PEa. The branch portions PEb extend in different directions according to the domains. In an exemplary embodiment, each pixel PX includes four domains, but the number of the domains is not limited to only four. That is, each pixel PX may include two, six, or eight domains or more.

The first alignment layer ALN1 is disposed on the pixel electrode PE. The first alignment layer ALN1 pretilts the liquid crystal molecules LC of the liquid crystal layer LCL. The first alignment layer ALN1 will be described in detail later.

The second substrate SUB2 includes a second base substrate BS2, a color filter CF, a black matrix BM, and a common electrode CE. The second base substrate BS2 may be formed of a polymer substrate, a plastic substrate, a glass substrate, or a quartz substrate, but is not limited thereto. The second substrate BS2 may be, but is not limited to, a transparent insulating substrate. The second base substrate BS2 may be flexible or rigid.

The color filter CF is disposed on the second base substrate BS2 and assigns a color to a light passing through the liquid crystal layer LCL. In an exemplary embodiment, the color filter CF is included in the second substrate SUB2, but it is not limited thereto or thereby. That is, in exemplary embodiments, the color filter CF may be included in the first substrate SUB1.

The black matrix BM is disposed on the second base substrate BS2 in a position corresponding to a light blocking area of the first substrate SUB1. The light blocking area is the area in which the data lines DL, the thin film transistor TFT, and the gate lines GL are disposed. Since the pixel electrode PE is not formed in the light blocking area, the liquid crystal molecules are not aligned and light leakage may occur in the light blocking area. Thus, the black matrix BM disposed in the light blocking area prevents the occurrence of light leakage in the light blocking area. In an exemplary embodiment, the black matrix BM is included in the second substrate SUB2, but is not limited thereto or thereby. That is, in an exemplary embodiment, the black matrix BM may be included in the first substrate SUB1.

Although not shown in the figures, an insulating layer (not shown) may be disposed on the color filter CF and the black matrix BM.

The common electrode CE is disposed on the second base substrate BS2 and forms an electric field in cooperation with the pixel electrode PE to drive the liquid crystal layer LCL. In an exemplary embodiment, the common electrode CE is included in the second substrate SUB2, but is not limited thereto or thereby. That is, the common electrode CE may be included in the first substrate SUB1. The common electrode CE is formed of a transparent conductive material. In detail, the common electrode CE is formed of a conductive metal oxide, such as indium tin oxide (ITO), indium zinc oxide (IZO), indium tin zinc oxide (ITZO), etc. The second alignment layer ALN2 is disposed on the second base substrate BS to cover the common electrode. The second alignment layer ALN2 will be described in detail later.

The liquid crystal layer LCL including the liquid crystal molecules LC is provided between the first and second substrates SUB1 and SUB2. The liquid crystal layer LCL includes liquid crystal molecules LC having a dielectric anisotropy and a liquid crystal composition containing reactive mesogens RM (refer to FIG. 9A) having a light absorption peak at a predetermined wavelength.

The liquid crystal molecules LC may be, but are not limited to, alkenyl-based liquid crystal molecules or alkoxy-based liquid crystal molecules.

The liquid crystal molecules LC may have a negative dielectric anisotropy, but are not limited thereto or thereby. That is, the liquid crystal molecules LC may have a positive dielectric anisotropy.

The terms "reactive mesogens" or "reactive mesogens RM" as used herein refer to a photo-crosslinkable low molecular weight or a high molecular weight copolymer capable of causing a chemical reaction when an ultraviolet ray is applied thereto. In exemplary embodiments, the reactive mesogens RM include at least one of acrylate, methacrylate, epoxy, oxetane, vinyl ether, and styrene. In addition, the reactive mesogens RM may be a material having a bar shaped structure, a banana shaped structure, a board shaped structure, or a disc shaped structure.

The polymerization reaction is initiated by the photo-initiator. For instance, when the photo-initiator containing a benzyl dimethyl ketal group is used, the polymerization reaction occurs by applying a light having a wavelength of about 340 nm. The polymerization reaction of the reactive mesogens RM is initiated by the polymerization reaction of the photo-initiator, thereby causing a chain reaction. When the photo-initiator is present only in one side portion, e.g., the first substrate, the polymerization reaction of the reactive mesogen RM in the one side portion occurs much faster than the polymerization reaction of the reactive mesogen RM in the other side portion in which the photo-initiator is not present. Accordingly, the photo-initiator is provided to only a first base layer PAL1, and thus a first alignment forming layer PTL1 may be formed only on the first base substrate BS1.

Figure 5A:
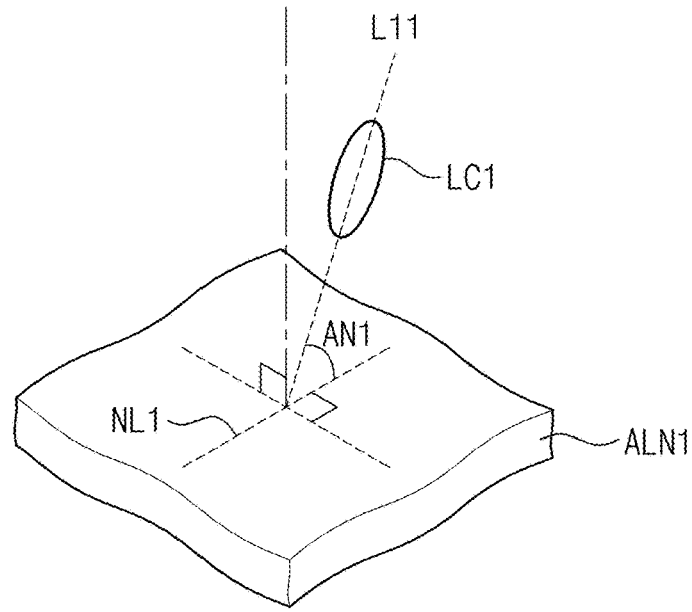
FIG. 5A is a perspective view showing a first pretilt angle of first liquid crystal molecules.
Figure 5B:
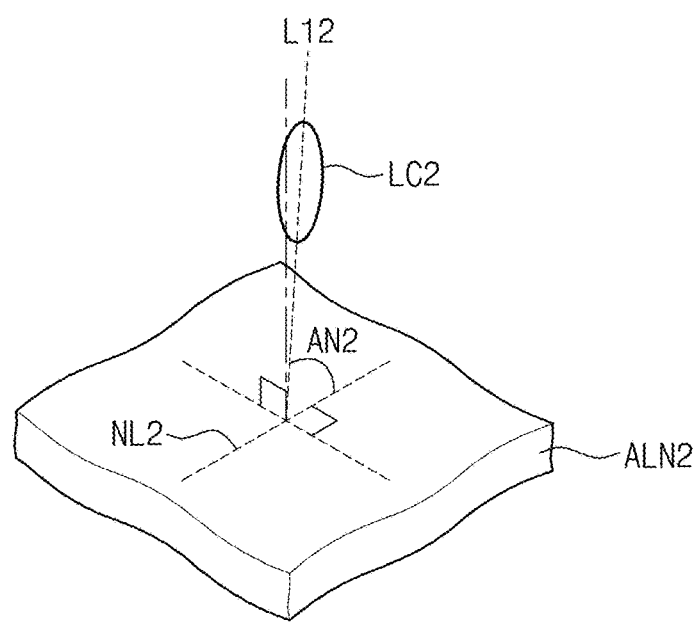
FIG. 5B is a perspective view showing a second pretilt angle of second liquid crystal molecules.

FIG. 5A is a perspective view showing a first pretilt angle AN1 of first liquid crystal molecules and FIG. 5B is a perspective view showing a second pretilt angle AN2 of second liquid crystal molecules. Hereinafter, the first and second alignment layers ALN1 and ALN2 will be described in detail.

The first alignment layer ALN1 includes reactive mesogens RM polymerized with each other. Accordingly, among all of the liquid crystal molecules LC of the liquid crystal layer LCL, the first alignment layer ALN1 pretilts the first liquid crystal molecules LC1 which are adjacent to the first alignment layer ALN1. The first liquid crystal molecules LC1 have the first pretilt angle AN1 with respect to the first alignment layer ALN1.

Referring to FIG. 5A, an angle between a first straight line NL1 on one surface of the first alignment layer ALN1 and a long axis L11 of the first liquid crystal molecules LC1 corresponds to the first pretilt angle AN1. The first pretilt angle AN1 corresponds to an average value of the pretilt angles of the first liquid crystal molecules LC1. In an exemplary embodiment, the first pretilt angle AN1 has an average value of about 80 degrees to about 90 degrees. In another exemplary embodiment, the first pretilt angle AN1 has an average value of about 80 degrees to about 89 degrees. In yet another exemplary embodiment, the first pretilt angle AN1 may have an average value of greater than about 80 degrees and smaller than about 88 degrees, in order to be different from a second pretilt angle AN2.

Referring to FIGS. 4 and 5A, the first alignment layer ALN1 includes the first base layer PAL1 disposed on the pixel electrode PE and the first alignment forming layer PTL1 disposed on the first base layer PAL1.

The first alignment layer ALN1 includes at least one compound having a chemical structure represented by the following Chemical formulas 1 and 2.

Chemical formula 1

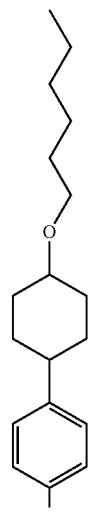

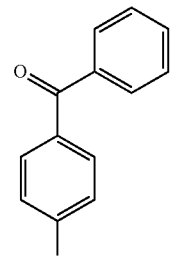

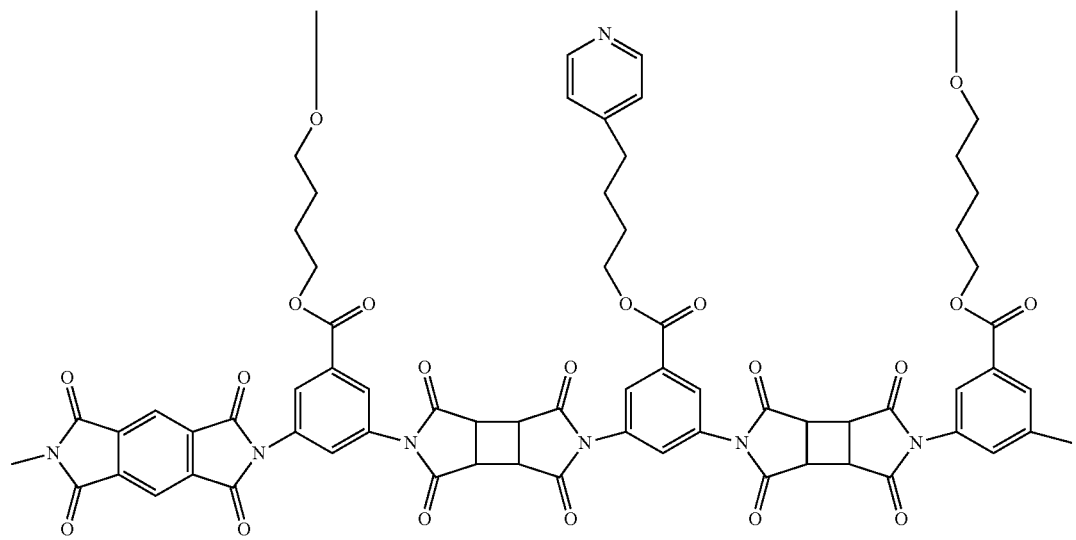

Chemical formula 2

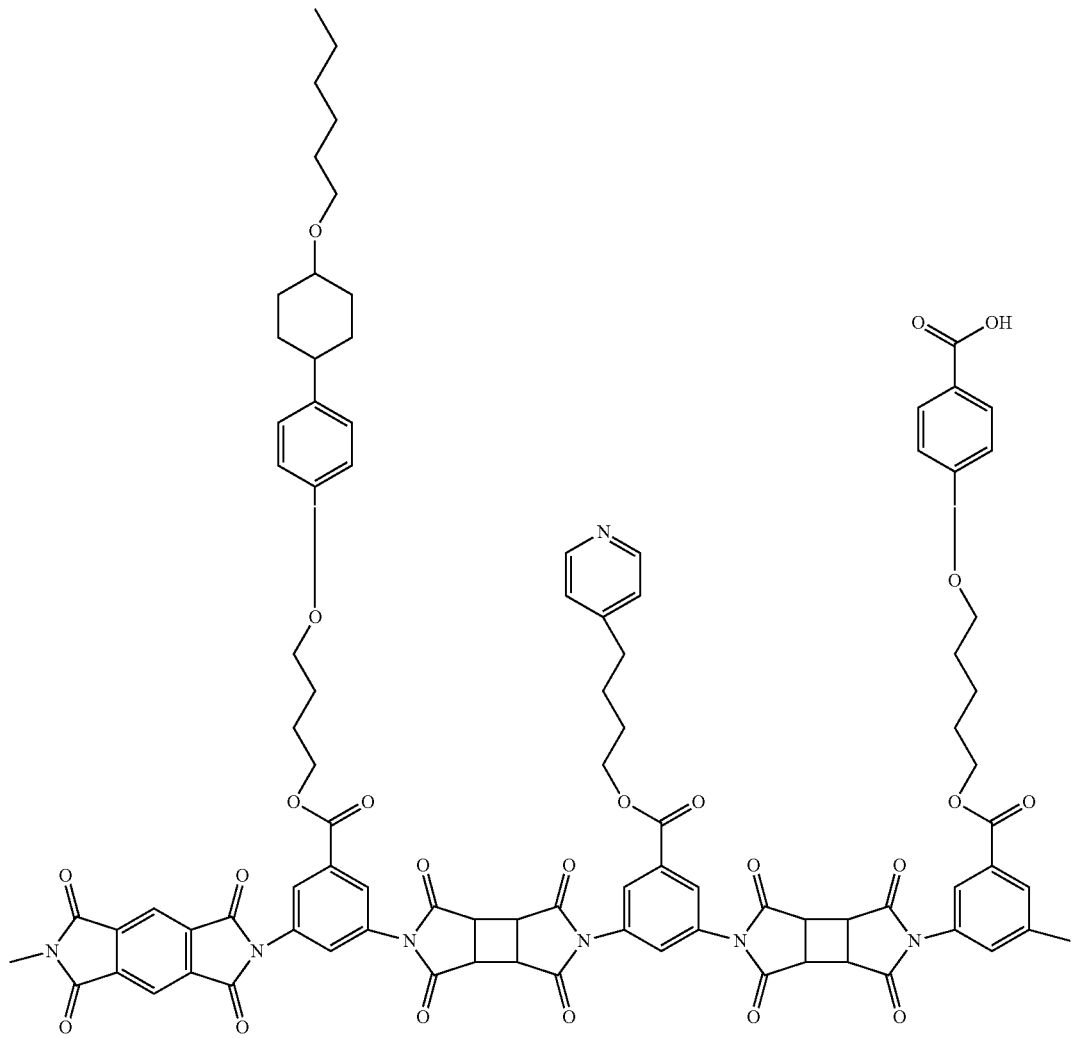

The compound having a structure represented by Chemical formula 1 is present on the surface of the first alignment layer ALN1 in an amount greater than a compound having a structure represented by the Chemical formula 2.

The first base layer PAL1 may include polymers. In exemplary embodiments, the polymers include at least one of polyimide, polyamic acid, polyamide, polyamic imide, polyester, polyethylene, polyurethane, polystyrene, etc., a mixture thereof, and a monomer thereof.

The first base layer PAL1 is formed by coating a first alignment solution on the first base substrate BS1 and heating the first alignment solution.

The first alignment solution includes a first alignment agent polymerized to form the first base layer PAL1, the photo-initiator that initiates the photo-polymerization of the reactive mesogens RM, and a solvent.

The first alignment agent includes a monomer of the polymer, such as a monomer of polyimide, polyamic acid, polyamide, polyamic imide, polyester, polyethylene, polyurethane, polystyrene, etc., or a dimer, an oligomer, or a mixture thereof.

In an exemplary embodiment, the first alignment agent may further include an additive. The additive may be an antioxidant, to prevent the liquid crystal molecules LC from being oxidized.

In exemplary embodiments, the photo initiator includes at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro-acetophenone, α-chlorothioxanthone, and benzoin alkylether, etc.

Commercially available photo-initiators may be used, such as Irgacure® 651, Irgacure® 127, Irgacure® 754, Irgacure® 819, Irgacure® 784, Irgacure® 907, Irgacure® 369, Irgacure® 379, Irgacure® 2959, Irgacure® OXE01, Irgacure® OXE02, or Darocure® TPO, which are manufactured by BASF Co., Ltd.

In an exemplary embodiment, the photo-initiator is provided in amounts of about 0.001 parts by weight to about 20 parts by weight, or about 0.001 parts by weight to about 1 part by weight, per 100 parts by weight of the alignment agent. The content of the photo-initiator is dependent upon the kind of photo-initiator to be used and the wavelength that initiates the photo-reaction. For instance, when the photo-initiator is Irgacure® 651, the photo-initiator is provided in amounts of about 0.05 parts by weight; when the photo-initiator is Irgacure® 127, the photo-initiator is provided in amounts of about 0.1 parts by weight; when the photo-initiator is Irgacure® 754, the photo-initiator is provided in amounts of about 0.2 parts by weight; when the photo-initiator is Irgacure® 819, the photo-initiator is provided in amounts of about 0.01 parts by weight to about 0.1 parts by weight; when the photo-initiator is Irgacure® 784, the photo-initiator is provided in amounts of about 0.1 parts by weight; when the photo-initiator is Irgacure® 907, the photo-initiator is provided in amounts of about 0.001 parts by weight to about 0.1 parts by weight; when the photo-initiator is Irgacure® 369, the photo-initiator is provided in amounts of about 0.001 parts by weight to about 0.1 parts by weight; when the photo-initiator is Irgacure® 379, the photo-initiator is provided in amounts of about 0.001 parts by weight to about 0.1 parts by weight; when the photo-initiator is Irgacure® 2959, the photo-initiator is provided in amounts of about 0.001 parts by weight to about 0.1 parts by weight; when the photo-initiator is Irgacure® OXE01, the photo-initiator is provided in amounts of about 0.01 parts by weight; when the photo-initiator is Irgacure® OXE02, the photo-initiator is provided in amounts of about 0.01 parts by weight; and when the photo-initiator is Darocure® TPO, the photo-initiator is provided in amounts of about 0.01 parts by weight.

In an exemplary embodiment, the solvent may be one of γ-butyrolactone, ethylene glycol butyl ether, and N-methyl-pyrrolidone, or a mixture obtained by mixing at least two of γ-butyrolactone, ethylene glycol butyl ether, and N-methyl-pyrrolidone. However, the solvent is not limited to a specific material.

The first alignment solution is polymerized by heat, and thus the first alignment solution is cured to form the first base layer PAL1. Since the first base layer PAL1 is formed through a heat curing process, at least a portion of the photo-initiator does not react, so that at least the portion of the photo-initiator remains in the first alignment layer ALN1.

The first alignment forming layer PTL1 includes the polymerized reactive mesogens RM (refer to FIG. 9A) and pretilts the liquid crystal molecules LC. The term "reactive mesogens" or "reactive mesogens RM" as used herein means a photocrosslinkable low molecular weight or a high molecular weight copolymer. When the ultraviolet light is applied to the reactive mesogens RM, the reactive mesogens cause a chemical reaction. As a result, a portion of the reactive mesogens RM are polymerized to be crosslinked. The reactive mesogens RM pretilt the liquid crystal molecules LC to have a predetermined tilt angle with respect to the surface of the first substrate SUB1.

In an exemplary embodiment, the reactive mesogens RM are not limited to any specific type of reactive mesogen as long as the polymerization reaction of the reactive mesogens RM is initiated by the photo-initiator when exposed to a predetermined wavelength. The reactive mesogens RM may be selected from compounds represented by following Chemical formula 3.

P1-sp1-A1-sp2-(A2)m-sp3-A3-sp4-P2    Chemical formula 3

In the above Chemical formula 3, "P1" denotes an end group containing two to six reaction groups that cause the polymerization reaction. The P1 reaction groups may be, but are not limited to, an acrylate group, a methacrylate group, an epoxy group, an oxetane group, a vinyl ether group, or a styrene group. Herein, "P2" is selected independently from "P1" and denotes an end group containing two to six reaction groups that cause the polymerization reaction. The P2 reaction groups may be, but are not limited to, an acrylate group, a methacrylate group, an epoxy group, an oxetane group, a vinyl ether group, or a styrene group. Herein, "Sp1", "Sp2", "Sp3", and "Sp4" are independently a single bond or a spacer group including at least one of —$CH_2$—, —COO—, —CO—CH=CH—, —COO—CH=CH—, —$CH_2OCH_2$—, and —$CH_2O$—. Herein, "A1" and "A3" are independently a single bond, a cyclohexyl group, a phenyl group, a thiophenyl group, or a polycyclic aromatic group. Herein, "A2" is a cyclohexyl group, a phenyl group, a thiophenyl group, or a polycyclic aromatic hydrocarbon group. In Chemical formula 3, "m" is 1 to 4.

The reactive mesogens RM may form first protrusions BU1 (FIG. 4). The first protrusions BU1 include first small-size protrusions SBU1 and first large-size protrusions LBU1.

Each first protrusion BU1 has a particle size of about 1 nm or more in diameter. The average particle size of the first protrusions BU1 is equal to or greater than about 1 nm in diameter and a representative particle size of the first protrusions BU1 is equal to or greater than about 1 nm in diameter.

The first small-size protrusions SBU1 are distinct from the first large-size protrusions LBU1 as viewed relative to a particle size of about 30 nm. For instance, the first small-size protrusions SBU1 have a particle size equal to or greater than about 1 nm or less than about 30 nm in diameter. The particle size of each of the first small-size protrusions SBU1 is equal to or greater than about 1 nm and less than about 30 nm, the average particle sizes of the first small-size protrusions SBU1 is equal to or greater than about 1 nm and less than about 30 nm in diameter, and the representative particle size value is equal to or greater than about 1 nm and less than about 30 nm in diameter.

The first large-size protrusions LBU1 have a particle size equal to or greater than about 30 nm in diameter. The particle size of each of the first large-size protrusions LBU1 is equal to or greater than about 30 nm and less than about 1000 nm in diameter, the average particle size of the first large-size protrusions LBU1 is equal to or greater than about 30 nm and less than about 1000 nm in diameter, and the representative particle size value is equal to or greater than about 30 nm and less than about 1000 nm in diameter.

The first small-size protrusions SBU1 may be distinct from the first large-size protrusions LBU1 as viewed relative to a particle size of about 50 nm in diameter. For instance, the first small-size protrusions SBU1 have the particle size equal to or greater than about 1 nm or less than about 50 nm in diameter. The particle size of each of the first small-size protrusions SBU1 is equal to or greater than about 1 nm and less than about 50 nm in diameter, the average particle size of the first small-size protrusions SBU1 is equal to or greater than about 1 nm and less than about 50 nm, and the representative value particle size is equal to or greater than about 1 nm and less than about 50 nm in diameter.

The first large-size protrusions LBU1 have a particle size equal to or greater than about 50 nm. The particle size of each of the first large-size protrusions LBU1 is equal to or greater than about 50 nm and less than about 1000 nm in diameter, the average particle size of the first large-size protrusions LBU1 is equal to or greater than about 50 nm and less than about 1000 nm in diameter, and the representative particle size value is equal to or greater than about 50 nm and less than about 1000 nm in diameter.

The second alignment layer ALN2 is disposed on the common electrode CE. The second alignment layer ALN2 does not include the polymerized reactive mesogens RM, and thus among the liquid crystal molecules LC of the liquid crystal layer LC, the second alignment layer ALN2 does not pretilt the second liquid crystal molecules LC2 which are adjacent to the second alignment layer ALN2 L.

The liquid crystal molecules LC2 have the second pretilt angle AN2 with respect to the second alignment layer ALN2.

Referring to FIG. 5B, the angle between a second straight line NL2 on one surface of the second alignment layer ALN2 and a long axis L12 of the second liquid crystal molecules LC2, corresponds to the second pretilt angle AN2. The second pretilt angle AN2 is different from the first pretilt angle AN1 and greater than the first pretilt angle AN1. For instance, the second pretilt angle AN2 corresponds to an average value, or a representative value, of the pretilt angles of the second liquid crystal molecules LC2. In an exemplary embodiment, the second pretilt angle AN2 is about 88 degrees to about 90 degrees. In another embodiment, the second pretilt angle AN2 is about 89 degrees or equal to or less than about 90 degrees. The second pretilt angle AN2 is set to be greater than the first pretilt angle AN1. According to an exemplary embodiment, when the first pretilt angle AN1 is set to about 80, about 85, about 86, or about 89 degrees, the second pretilt angle AN2 is set to about 89.5 degrees or about 90 degrees, which is greater than the first pretilt angle AN1.

Referring to FIGS. 4 and 5B, the second alignment layer ALN2 includes a second base layer PAL2 disposed on the common electrode CE and the second alignment forming layer PTL2 disposed on the second base layer PAL2. The second base layer PAL2 is formed of a polymer and includes at least one of polyimide, polyamic acid, polyamide, polyamic imide, polyester, polyethylene, polyurethane, polystyrene, etc., a mixture of polymers, and a monomer of one or more polymers.

The second base layer PAL2 is disposed on the second base substrate BS2 on which the common electrode CE is disposed. The second base layer PAL2 is formed by coating a second alignment solution on the second base substrate BS1 and heating the second alignment solution.

The second alignment solution includes a second alignment agent polymerized to form the second base layer PAL2 and a solvent. The second alignment solution does not include the photo-initiator included in the first alignment solution.

The second alignment agent includes a monomer of the polymer, in which the polymer includes at least one of polyimide, polyamic acid, polyamide, polyamic imide, polyester, polyethylene, polyurethane, polystyrene, etc., a dimer, an oligomer, and a mixture thereof.

The solvent is not limited to a specific material. In an exemplary embodiment, the solvent includes at least one of γ-butyrolactone, ethylene glycol butyl ether, N-methylpyrrolidone, and a mixture obtained by mixing at least two of γ-butyrolactone, ethylene glycol butyl ether, and N-methylpyrrolidone.

The second alignment solution is polymerized by the heat, and thus the second alignment solution is cured to form the second base layer PAL2.

The second alignment forming layer PTL2 includes the polymerized reactive mesogens RM. The amount of the reactive mesogens RM included in the second alignment forming layer PTL2 is less than the amount of reactive mesogens in the first alignment forming layer PTL1, from the point of view of an absolute amount. In other words, the second alignment forming layer PTL2 does not include the polymerized reactive mesogens RM. Here, the expression that the second alignment forming layer PTL2 does not include the polymerized reactive mesogens RM means that a portion of the polymerized reactive mesogens RM is coupled to the second alignment forming layer PTL2 due to a process error.

The second alignment forming layer PTL2 aligns the second liquid crystal molecules LC2 to allow the second liquid crystal molecules LC2 to not to have a predetermined tilt angle with respect to the second substrate SUB2. Accordingly, the second liquid crystal molecules LC2 which are adjacent to the second base layer PAL2 are randomly disposed on the second alignment layer ALN2 without having a specific alignment direction. When the electric field is not applied to the liquid crystal layer LCL, the second liquid crystal molecules LC2 are aligned on the second alignment layer ALN2 in a direction vertical to the second alignment layer ALN2.

The reactive mesogens RM polymerized with each other may form second protrusions BU2 (FIG. 5). The second protrusions BU2 include second small-size protrusions SBU2 and second large-size protrusions LBU2.

Each second protrusion BU2 has a particle size of about 1 nm or more in diameter. An average particle size of the second protrusions BU2 is equal to or greater than about 1 nm in diameter, and a representative particle size value of the second protrusions BU2 is equal to or greater than about 1 nm in diameter.

The second small-size protrusions SBU2 are distinct from the second large-size protrusions LBU2 as viewed relative to a particle size of about 30 nm in diameter. For instance, the second small-size protrusions SBU2 have a particle size equal to or greater than about 1 nm or less than about 30 nm in diameter. The particle size of each of the second small-size protrusions SBU2 is equal to or greater than about 1 nm and less than about 30 nm in diameter, the average particle size of the second small-size protrusions SBU2 is equal to or greater than about 1 nm and less than about 30 nm in diameter, and the representative particle size value is equal to or greater than about 1 nm and less than about 30 nm in diameter.

The second large-size protrusions LBU2 have a particle size equal to or greater than about 30 nm in diameter. The particle size of each of the second large-size protrusion LBU2 is equal to or greater than about 30 nm and less than about 1000 nm in diameter, the average particle size of the second large-size protrusions LBU2 is equal to or greater than about 30 nm and less than about 1000 nm in diameter, and the representative particle size value is equal to or greater than about 30 nm and less than about 1000 nm in diameter.

The second small-size protrusions SBU2 may be distinct from the second large-size protrusions LBU2 as viewed relative to a particle size of about 50 nm in diameter. For instance, the second small-size protrusions SBU2 have the particle size equal to or greater than about 1 nm or less than about 50 nm in diameter. The particle size of each of the second small-size protrusions SBU2 is equal to or greater than about 1 nm and less than about 50 nm in diameter, the average particle size of the second small-size protrusions SBU2 is equal to or greater than about 1 nm and less than about 50 nm in diameter, and the representative particle size value is equal to or greater than about 1 nm and less than about 50 nm in diameter.

The second large-size protrusions LBU2 have a particle size equal to or greater than about 50 nm in diameter. The particle size of each of the second large-size protrusions LBU2 is equal to or greater than about 50 nm and less than about 1000 nm in diameter, the average particle size of the second large-size protrusions LBU2 is equal to or greater than about 50 nm and less than about 1000 nm in diameter, and the representative particle size value is equal to or greater than about 50 nm and less than about 1000 nm in diameter.

Hereinafter, the distribution of the first protrusions BU1 on the first base layer PAL1 and the distribution of the second protrusion BU2 on the second base layer PAL2, will be described in detail.

As described above, the reactive mesogens are polymerized with each other to form the first protrusions BU1 on the first base layer PAL1. In addition, the first protrusions BU1 include the first small-size protrusions SBU1 and the first large-size protrusions LBU1. In this case, the first base layer PAL1 includes a first overlap area overlapped with the first large-size protrusions LBU1 and a first non-overlap area not overlapped with the first large-size protrusions LBU1.

The polymerized reactive mesogens form the second protrusions BU2 on the second base layer PAL2. In addition, the second protrusions BU2 include both the second small-size protrusions SBU2 and the second large-size protrusions LBU2. In this case, the second base layer PAL2 includes a second overlap area overlapped with the second large-size protrusions LBU2 and a second non-overlap area not overlapped with the second large-size protrusions LBU2.

Figure 6A:
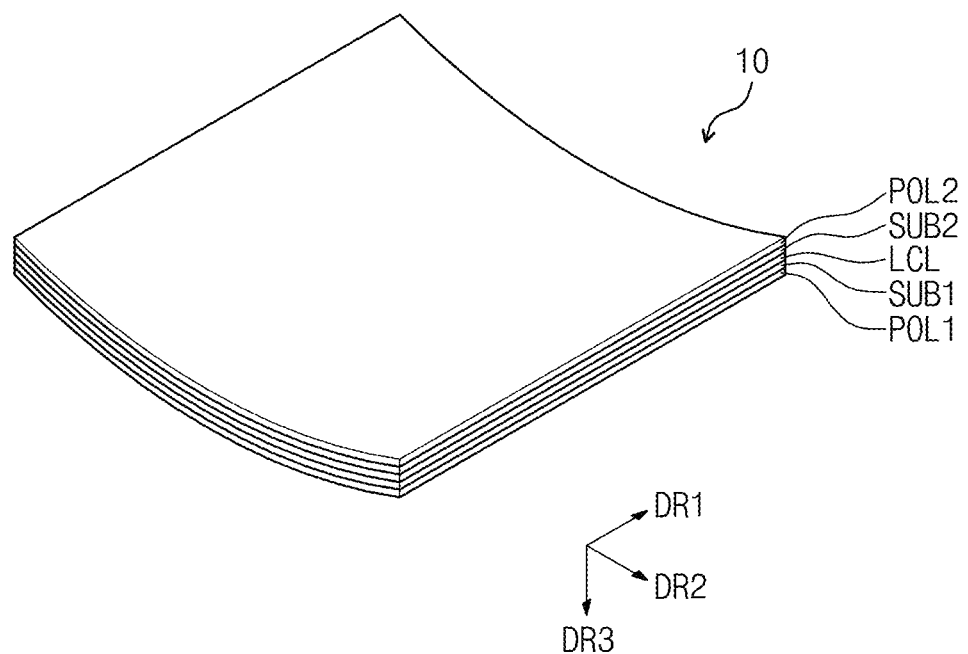
FIG. 6A is a perspective view showing an exemplary embodiment of a curved display device according to the present disclosure.
Figure 6B:
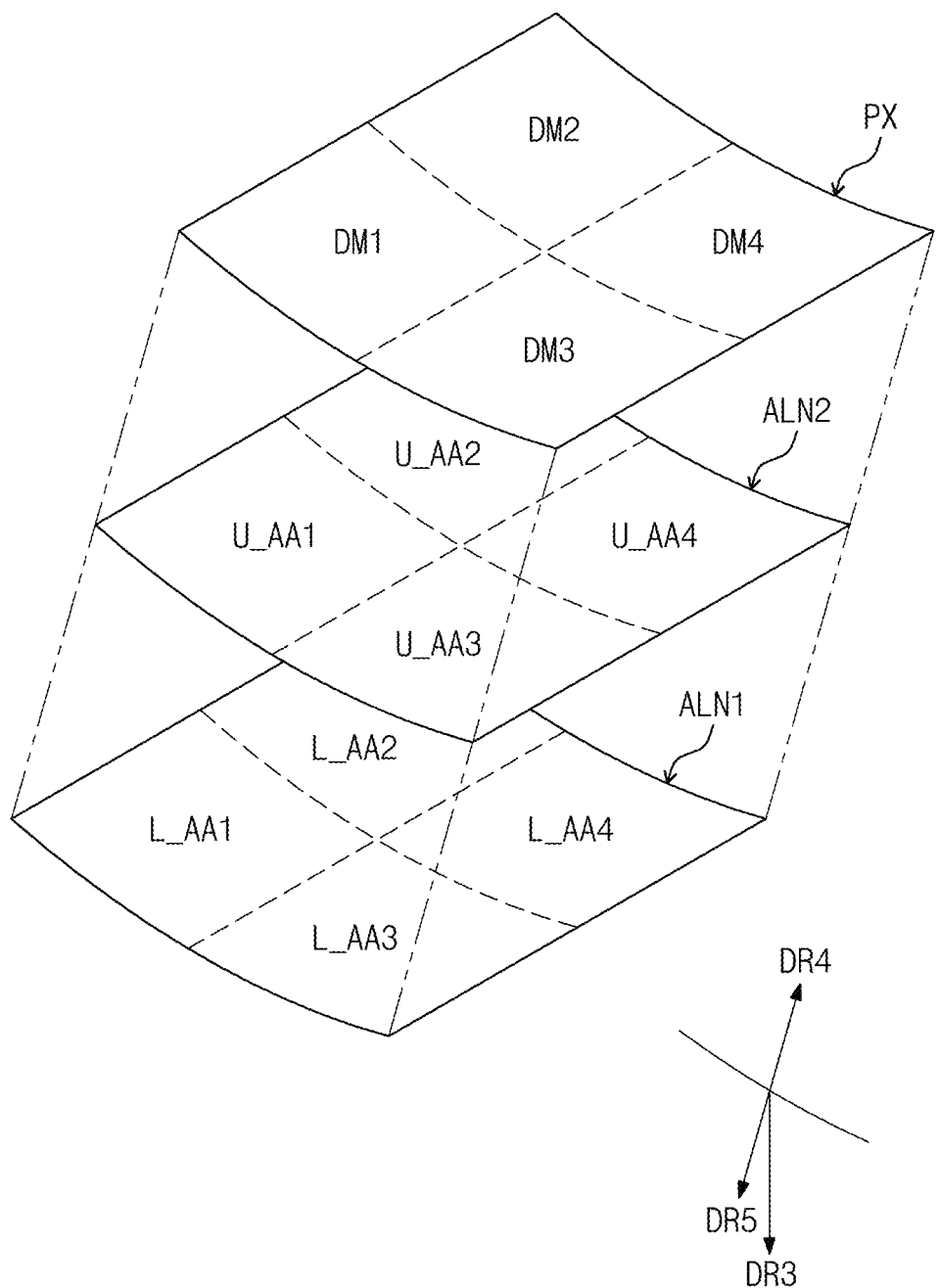
FIG. 6B is a perspective view showing an exemplary embodiment of a pixel and first and second alignment layers corresponding to the pixel according to the present disclosure.

The first overlap and first non-overlap areas are delineated from the second overlap and second non-overlap areas by a boundary line between an area in which the large-size protrusions are present and an area in which the large-size protrusions are not present when viewed from a third direction DR3 (refer to FIG. 6B).

The area of the first overlap area, which is described hereinafter, may be the whole area of the first overlap area on the first base layer PAL1, and an average value or a representative value of the area may be determined on the basis of an arbitrary unit area on the first base layer PAL1. In addition, the area of the first non-overlap area may be the whole area of the first non-overlap area on the first base layer PAL1, and an average value or a representative value of the area may be determined on the basis of an arbitrary unit area on the first base layer PAL1. Further, each of the area of the second overlap area and the area of the second non-overlap area may be the whole area of the second overlap and second non-overlap areas on the second base layer PAL2, and an average value or a representative value of the area may be determined on the basis of an arbitrary unit area on the second base layer PAL2.

In exemplary embodiments, the first and second large-size protrusions LBU1 and LBU2 have a particle size equal to or greater than about 30 nm and equal to or less than about 1000 nm in diameter.

When the first and second large-size protrusions LBU1 and LBU2 have a particle size equal to or greater than about 30 nm and equal to or less than about 1000 nm in diameter, the curved display device 10 satisfies the following Equation 1.

$$0 < \text{area of the second overlap area/area of the first overlap area} \leq 4/5 \quad \text{Equation 1}$$

When a value obtained by dividing the area of the second overlap area by the area of the first overlap area exceeds 4/5, the liquid crystal molecules adjacent to the second alignment layer ALN2 are pretilted, and thus a dark area in which the light is not perceived occurs, as will be described later with reference to FIGS. 7A to 7E.

The area of the second overlap area may be smaller than the area of the second non-overlap area. In an exemplary embodiment the curved display device 10 satisfies the following Equation 2.

$$0 < \text{area of the second overlap area/area of the second non-overlap area} \leq 5/10 \quad \text{Equation 2}$$

When a value obtained by dividing the area of the second overlap area by the area of the second non-overlap area is equal to or greater than 5/10, the liquid crystal molecules adjacent to the second alignment layer ALN2 are pretilted, and thus the dark area in which the light is not perceived occurs, as will be described later with reference to FIGS. 7A to 7E.

The area of the first overlap area is equal to or greater than about $3.0 \times 10^5$ nm$^2$ and equal to or less than about $1.0 \times 10^6$ nm$^2$ while the unit area of the surface of the first base layer PAL1 is about $1.0 \times 10^6$ nm$^2$. When the area of the first overlap area is smaller than about $3.0 \times 10^5$ nm$^2$ compared to the unit area (about $1.0 \times 10^6$ nm$^2$) of the surface of the first base layer PAL1, it is difficult to pretilt not only the liquid crystal molecules adjacent to the first alignment layer ALN1, but also the liquid crystal molecules adjacent to the second alignment layer ALN2 since the total number of the first large-size protrusions LBU1 is small.

The area of the second overlap area exceeds 0 nm$^2$ and is equal to or less than about $3.5 \times 10^5$ nm$^2$ while the unit area of the surface of the second base layer PAL2 is about $1.0 \times 10^6$ nm$^2$. When the area of the second overlap area exceeds about $3.5 \times 10^5$ nm$^2$ compared to the unit area (about $1.0 \times 10^6$ nm$^2$) of the surface of the second base layer PAL2, a dark area occurs in which the light is not perceived since the liquid crystal molecules adjacent to the second alignment layer ALN2 are pretilted.

Since the amount of the reactive mesogens RM included in the first alignment layer ALN1 is larger than the amount included in the second alignment layer ALN2, the number of the second large-size protrusions LBU2 is smaller than the number of the first large-size protrusions LBU1.

In an exemplary embodiment, the first and second large-size protrusions LBU1 and LBU2 have a particle size equal to or greater than about 50 nm and equal to or less than about 1000 nm.

When the first and second large-size protrusions LBU1 and LBU2 have a particle size equal to or greater than about 50 nm and equal to or less than about 1000 nm in diameter, the curved display device 10 satisfies the following Equation 3.

$$0 < \text{area of the second overlap area/area of the first overlap area} \leq 1/2 \quad \text{Equation 3}$$

When a value obtained by dividing the area of the second overlap area by the area of the first overlap area exceeds 1/2, the liquid crystal molecules adjacent to the second alignment layer ALN2 are pretilted, and thus the dark area in which the light is not perceived occurs.

The area of the second overlap area may be smaller than the area of the second non-overlap area. In an exemplary embodiment, the curved display device 10 satisfies the following Equation 4.

$$0 < \text{area of the second overlap area/area of the second non-overlap area} \leq 1/10 \quad \text{Equation 4}$$

When a value obtained by dividing the area of the second overlap area by the area of the second non-overlap area exceeds 1/10, the liquid crystal molecules adjacent to the second alignment layer ALN2 are pretilted, and thus the dark area in which the light is not perceived occurs.

The area of the first overlap area is equal to or greater than about $0.4 \times 10^5$ nm$^2$ and equal to or less than about $1.0 \times 10^6$ nm$^2$ while the unit area of the surface of the first base layer PAL1 is about $1.0 \times 10^6$ nm$^2$. In this case, it is difficult to pretilt not only the liquid crystal molecules adjacent to the first alignment layer ALN1 but also the liquid crystal molecules adjacent to the second alignment layer ALN2 since the number of the first large-size protrusions LBU1 is small.

The area of the second overlap area exceeds 0 nm$^2$ and is equal to or less than about $0.3 \times 10^5$ nm$^2$ while the unit area of the surface of the second base layer PAL2 is about $1.0 \times 10^6$ nm$^2$. When the area of the second overlap area exceeds about $0.3 \times 10^5$ nm$^2$ compared to the unit area (about $1.0 \times 10^6$ nm$^2$) of the surface of the second base layer PAL2, the dark area in which the light is not perceived occurs since the liquid crystal molecules adjacent to the second alignment layer ALN2 are pretilted.

Figure 6C:
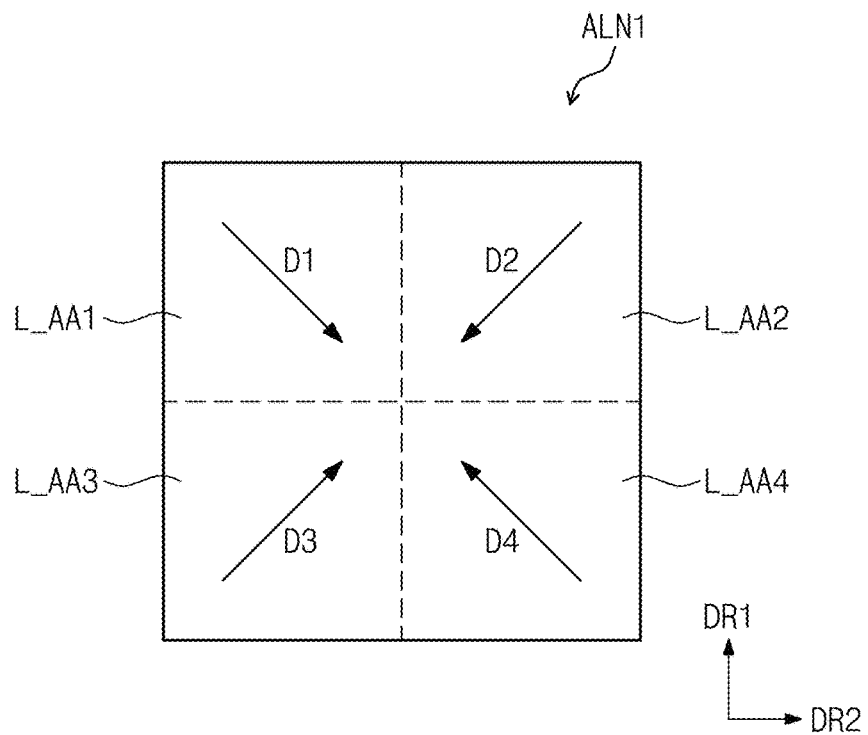
FIG. 6C is a plan view showing the first alignment layer when viewed from the direction DR5 of FIG. 6B.
Figure 6D:
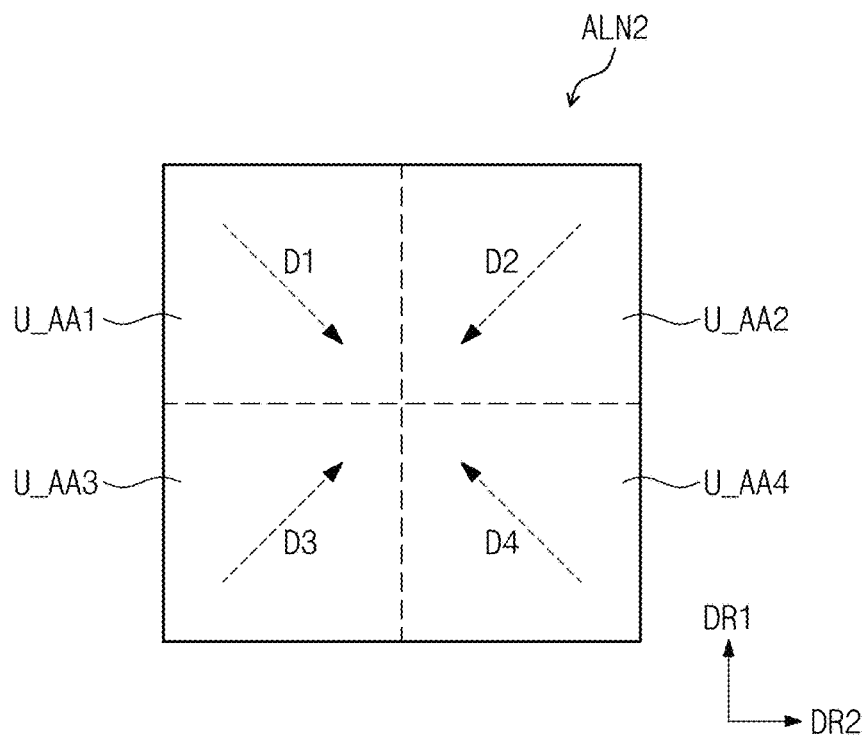
FIG. 6D is a plan view showing the second alignment layer when viewed from the direction DR5 of FIG. 6B.
Figure 6E:
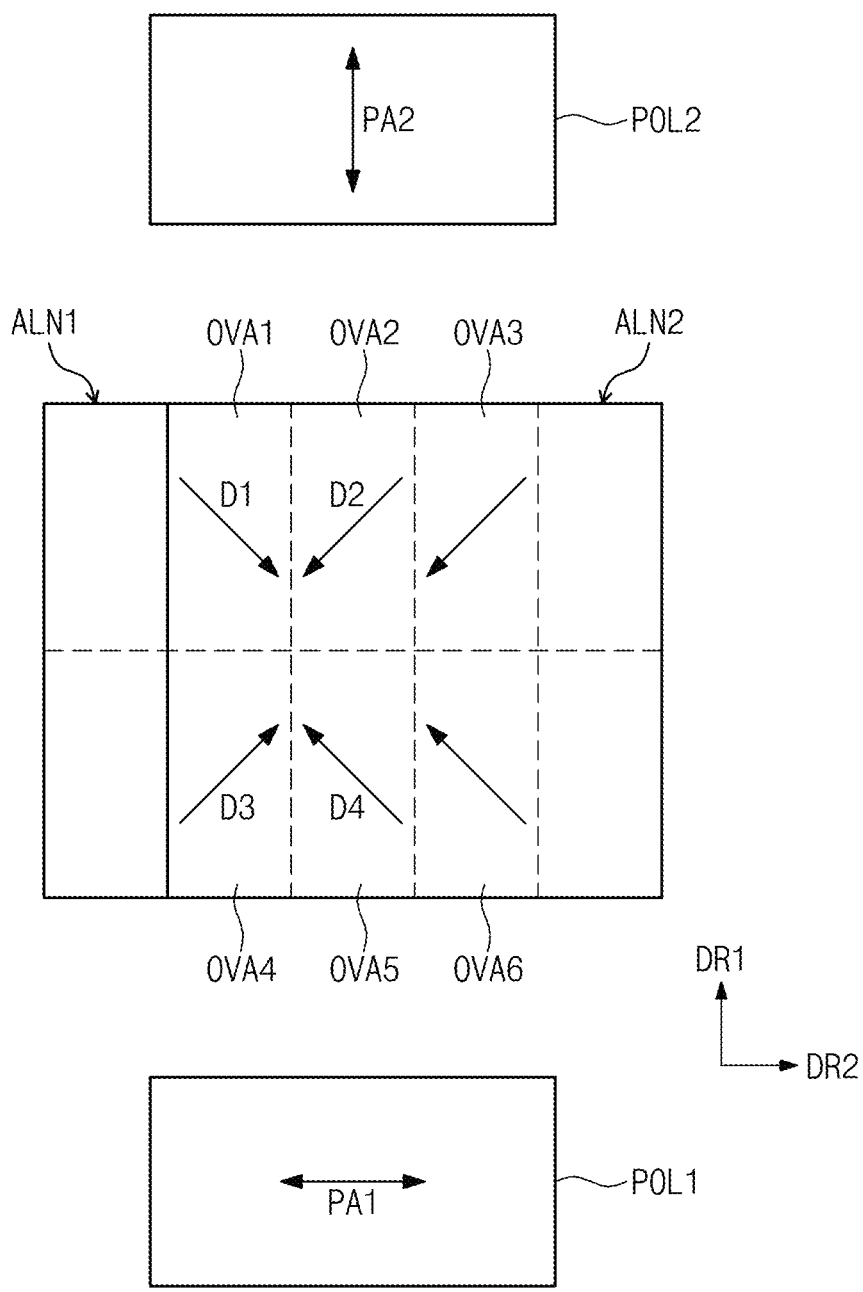
FIG. 6E is a plan view viewed from direction DR3 of FIG. 6B, showing an area in which the first and second alignment layers are overlapped with each other, a lower polarizing plate, and an upper polarizing plate.
Figure 6F:
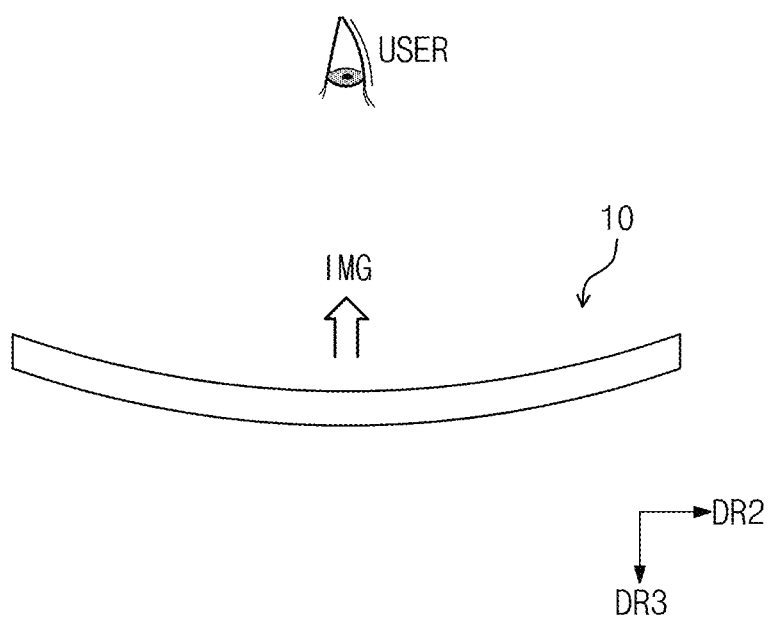
FIG. 6F is a view illustrating a user who recognizes an image displayed through an exemplary embodiment of the curved display device according to the present disclosure.

FIG. 6A is a perspective view showing an exemplary embodiment of a curved display device according to the present disclosure. FIG. 6B is a perspective view showing a pixel PX and first and second alignment layers ALN1 and ALN2 corresponding to the pixel PX according to an exemplary embodiment of the present disclosure. FIG. 6C is a plan view of the first alignment layer ALN1 when viewed from a direction DR5 of FIG. 6B. FIG. 6D is a plan view of the second alignment layer ALN2 when viewed from the direction DR5 of FIG. 6B. FIG. 6E is a plan view of an area in which the first and second alignment layers ALN1 and ALN2 are overlapped with each other, with a lower polarizing plate POL1, and with an upper polarizing plate POL2, as viewed from a third direction DR3 of FIG. 6B. FIG. 6E further shows the lower polarizing plate POL1 disposed under the first substrate SUB1 and an upper polarizing plate POL2 disposed on the second substrate SUB2. FIG. 6F is an illustration of a user who recognizes an image displayed through an exemplary embodiment of a curved display device according to the present disclosure.

Referring to FIGS. 6A to 6D, the first alignment layer ALN1 includes four lower alignment areas designated L_AA1, L_AA2, L_AA3, and L_AA4. The lower alignment areas L_AA1, L_AA2, L_AA3, and L_AA4 include a first lower alignment area L_AA1, a second lower alignment area L_AA2, a third lower alignment area L_AA3, and a fourth lower alignment area L_AA4. The lower alignment areas L_AA1, L_AA2, L_AA3, and L_AA4 are disposed to overlap with domains DM1, DM2, DM3, and DM4 in the direction DR5 opposite to a normal line direction DR4 of the pixel PX.

The first liquid crystal molecules LC1 (refer to FIG. 4) are pretilted by the polymerized reactive mesogens RM (refer to FIG. 9A) on each of the first lower alignment area L_AA1, the second lower alignment area L_AA2, the third lower alignment area L_AA3, and the fourth lower alignment area L_AA4, which respectively correspond to the first, second, third, and fourth domains DM1, DM2, DM3, and DM4. When the electric field is applied to the liquid crystal layer LCL, the pretilted liquid crystal molecules are horizontally aligned much faster than the liquid crystal molecules that are not pretilted. That is, the vertically aligned liquid crystal molecules are rapidly realigned in the horizontal direction.

When the electric field is applied to the liquid crystal layer LCL, the pretilted first liquid crystal molecules are horizontally aligned on the first lower alignment area L_AA1 in the extending direction of the branch portions PEb (refer to FIG. 3). The extending direction of the branch portions PEb is substantially parallel to a first sub-direction D1. The first sub-direction D1 refers to an average direction of all directions in which the first liquid crystal molecules LC1 are horizontally aligned on the first lower alignment area L_AA1.

Similarly, when the electric field is applied to the liquid crystal layer LCL, the pretilted first liquid crystal molecules LC1 are horizontally aligned in a second sub-direction D2 on the second lower alignment area L_AA2, horizontally aligned in a third sub-direction D3 on the third lower alignment area L_AA3, and horizontally aligned in a fourth sub-direction D4 on the fourth lower alignment area L_AA4. The second sub-direction D2 refers to an average direction of all directions in which the first liquid crystal molecules LC1 are horizontally aligned on the second lower alignment area L_AA2; the third sub-direction D3 refers to an average direction of all directions in which the first liquid crystal molecules LC1 are horizontally aligned on the third lower alignment area L_AA3; and the fourth sub-direction D4 refers to an average direction of all directions in which the first liquid crystal molecules LC1 are horizontally aligned on the fourth lower alignment area L_AA4.

The second alignment layer ALN2 includes four upper alignment areas U_AA1, U_AA2, U_AA3, and U_AA4. The upper alignment areas U_AA1, U_AA2, U_AA3, and U_AA4 include a first upper alignment area U_AA1, a second upper alignment area U_AA2, a third upper alignment area U_AA3, and a fourth upper alignment area U_AA4. The upper alignment areas U_AA1, U_AA2, U_AA3, and U_AA4 are disposed to respectively overlap with the domains DM1, DM2, DM3, and DM4 in the direction DR5, which lies in an opposite direction to the normal line direction DR4 of the pixel PX.

The second alignment layer ALN2 does not include the polymerized reactive mesogens RM. Accordingly, the second liquid crystal molecules LC2 are not pretilted on each of the first upper alignment area U_AA1, the second upper alignment area U_AA2, the third upper alignment area U_AA3, and the fourth upper alignment area U_AA4. As a result, the second liquid crystal molecules LC2 are randomly provided without having a specific alignment direction.

When the electric field is applied to the liquid crystal layer LCL, the second liquid crystal molecules LC2 are randomly and horizontally aligned. However, the second liquid crystal molecules LC2 may have a direction which is substantially parallel to the first sub-direction D1 due to the pretilted first liquid crystal molecules LC1 and the branch portions PEb. The degree in which the first liquid crystal molecules LC1 of the first lower alignment area L_AA1 are aligned in the first sub-direction D1 is referred to as a first scholar value, and the degree in which the second liquid crystal molecules LC2 of the first upper alignment area U_AA1 are aligned in the first sub-direction D1 is referred to as a second scholar value. The second scholar value is much smaller than the first scholar value. Since the second liquid crystal molecules LC2 are not pretilted, the speed at which the second liquid crystal molecules LC2 are horizontally aligned on the first upper alignment area U_AA1 is extremely slow as compared to the speed at which the first liquid crystal molecules LC1 (refer to FIG. 4) are horizontally aligned on the first lower alignment area L_AA1. In addition, the number of the second liquid crystal molecules LC2 horizontally aligned in the first sub-direction D1 is much smaller than the number of the first liquid crystal molecules LC1 horizontally aligned in the first sub-direction D1.

Similarly, when the electric field is applied to the liquid crystal layer LCL, the second liquid crystal molecules LC2 are: horizontally aligned in the second sub-direction D2 on the second upper alignment area U_AA2, horizontally aligned in the third sub-direction D3 on the third upper alignment area U_AA3, and horizontally aligned in the fourth sub-direction D4 on the fourth upper alignment area U_AA4.

Referring to FIGS. 6A to 6E, when viewed in the third direction DR3, the first and second alignment layers ALN1 and ALN2 have six overlap areas OVA1, OVA2, OVA3, OVA4, OVA5, and OVA6, each in which the first and second alignment layers ALN1 and ALN2 overlap with each other. The overlap areas OVA1, OVA2, OVA3, OVA4, OVA5, and OVA6 include a first overlap area OVA1, a second overlap area OVA2, a third overlap area OVA3, a fourth overlap area OVA4, a fifth overlap area OVA5, and a sixth overlap area OVA6.

When the electric field is applied to the liquid crystal layer LCL, a direction of an optical axis of the liquid crystal layer LCL may be substantially the same as an average value of the horizontal alignment direction of the first liquid crystal molecules LC1 on the lower alignment areas LAA1, L_AA2, L_AA3, and L_AA4 and the horizontal alignment direction of the second liquid crystal molecules LC2 on the upper alignment areas U_AA1, U_AA2, U_AA3, and U_AA4.

The second overlap area OVA2 corresponds to an area in which the second lower alignment area L_AA2 overlaps the first upper alignment area U_AA1. Since the second liquid crystal molecules LC2 substantially are not pretilted and the first liquid crystal molecules LC1 are pretilted, the speed at which the second liquid crystal molecules LC2 are horizontally aligned in the first overlap area OVA1 is extremely slow as compared to the speed at which the first liquid crystal molecules LC1 are horizontally aligned in the first overlap area OVA1. In addition, the number of the second liquid crystal molecules LC2 horizontally aligned in the second sub-direction D2 is much smaller than the number of the first liquid crystal molecules LC1 horizontally aligned in the first sub-direction D1.

Therefore, when the electric field is applied to the liquid crystal layer LCL, the direction of the optical axis of the liquid crystal layer LCL may be substantially parallel to the second sub-direction D2 in the second overlap area OVA2. Similarly, when the electric field is applied to the liquid crystal layer LCL, the direction of the optical axis of the liquid crystal layer LCL may be substantially parallel to the fourth sub-direction D4 in the fifth overlap area OVA5.

The horizontal alignment direction of the first liquid crystal molecules LC1 in the first overlap area OVA1 may be substantially the same as the horizontal alignment direction of the second liquid crystal molecules LC2. Thus, the direction of the optical axis of the liquid crystal layer LCL may be substantially parallel to the first sub-direction D1 in the first overlap area OVA1. Similarly, the direction of the optical axis of the liquid crystal layer LCL may be substantially parallel to the second sub-direction D2 in the third overlap area OVA3, the direction of the optical axis of the liquid crystal layer LCL may be substantially parallel to the third sub-direction D3 in the fourth overlap area OVA4, and the direction of the optical axis of the liquid crystal layer LCL may be substantially parallel to the fourth sub-direction D4 in the sixth overlap area OVA6.

The lower polarizing plate POL1 has a first transmission axis PA1 and the upper polarizing plate POL2 has a second transmission axis PA2. The first transmission axis PA1 is substantially perpendicular to the second transmission axis PA2. For instance, when the first transmission axis PA1 is substantially parallel to the second direction DR2, the second transmission axis PA2 is substantially parallel to the first direction DR1. In FIG. 6E, for convenience of explanation, the lower and upper polarizing plates POL1 and POL2 are shown to be smaller than the first and second alignment layers ALN1 and ALN2.

Referring to FIGS. 6A to 6F, the direction of the optical axis of the liquid crystal layer LCL is not parallel to the direction of the first transmission axis PA1 of the lower polarizing plate POL1 or to the direction of the second transmission axis PA2 of the upper polarizing plate POL2 in each of the first, second, third, fourth, fifth, and sixth overlap areas OVA1, OVA2, OVA3, OVA4, OVA5, and OVA6 of the exemplary curved display device 10. Accordingly, the user USER may perceive the light transmitting through the first, second, third, fourth, fifth, and sixth overlap areas OVA1, OVA2, OVA3, OVA4, OVA5, and OVA6.

Figure 7A:
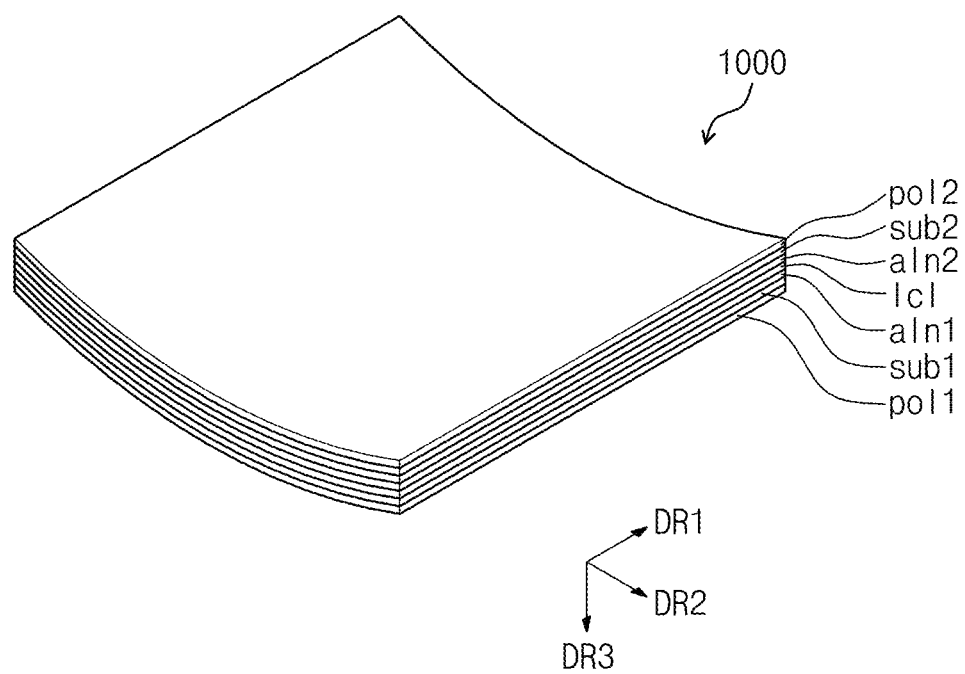
FIG. 7A is a perspective view showing a comparative example of a curved display device.
Figure 7B:
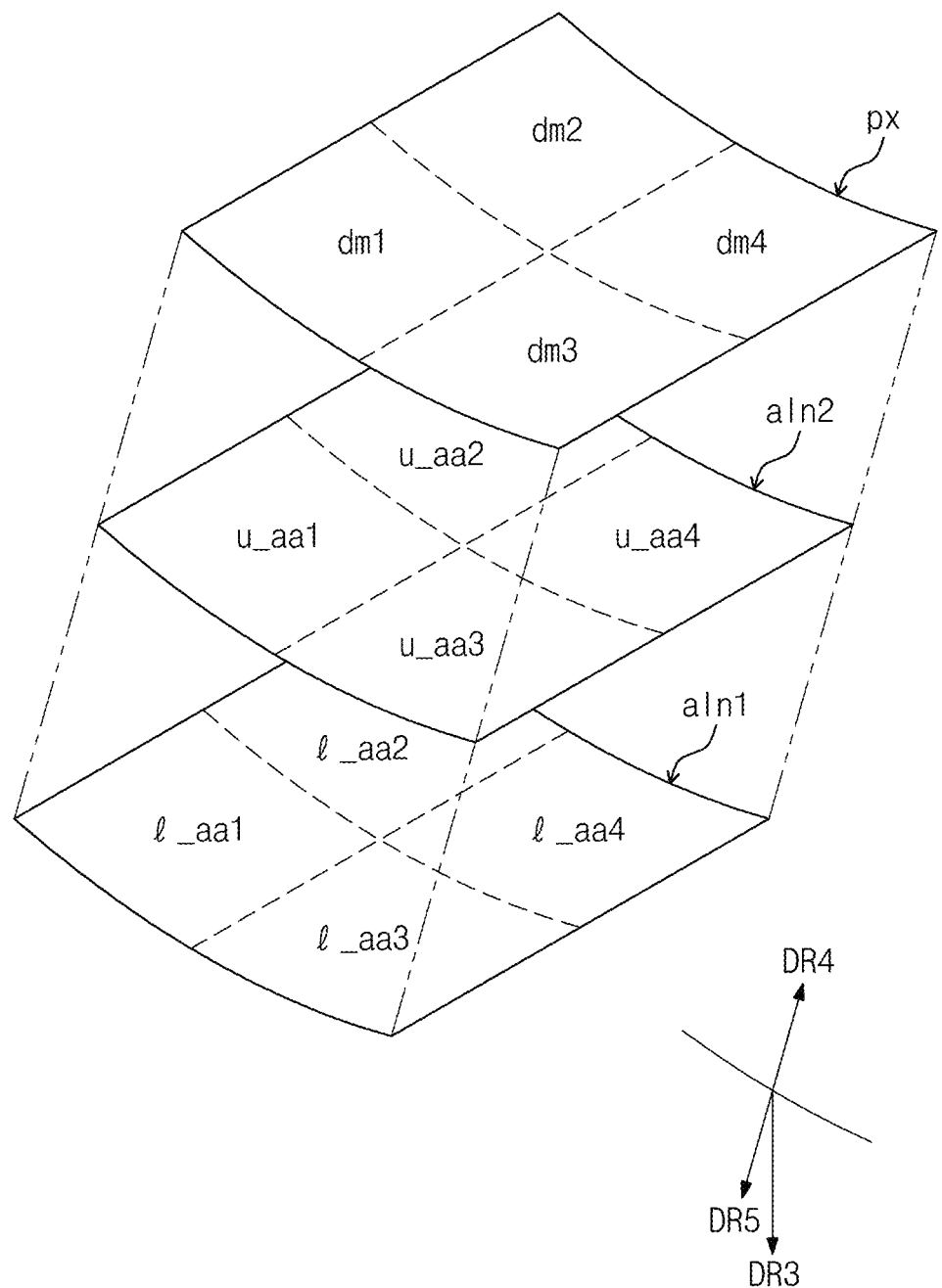
FIG. 7B is a perspective view showing a pixel and first and second alignment layers corresponding to the pixel, which are included in the comparative example of the curved display device.
Figure 7C:
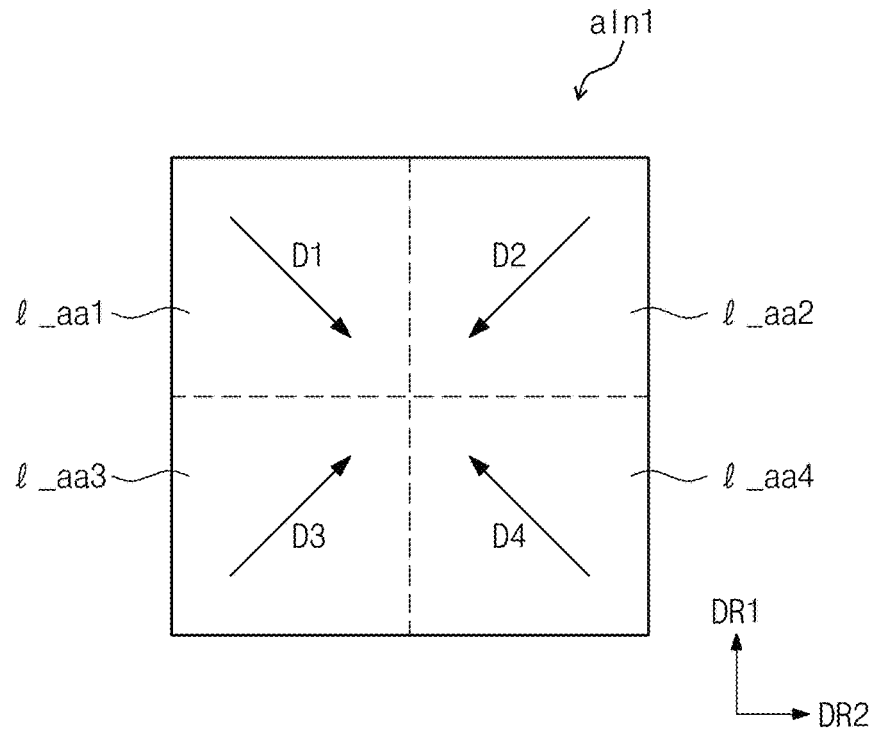
FIG. 7C is a plan view showing the first alignment layer when viewed from the direction DR5 of FIG. 7B.
Figure 7D:
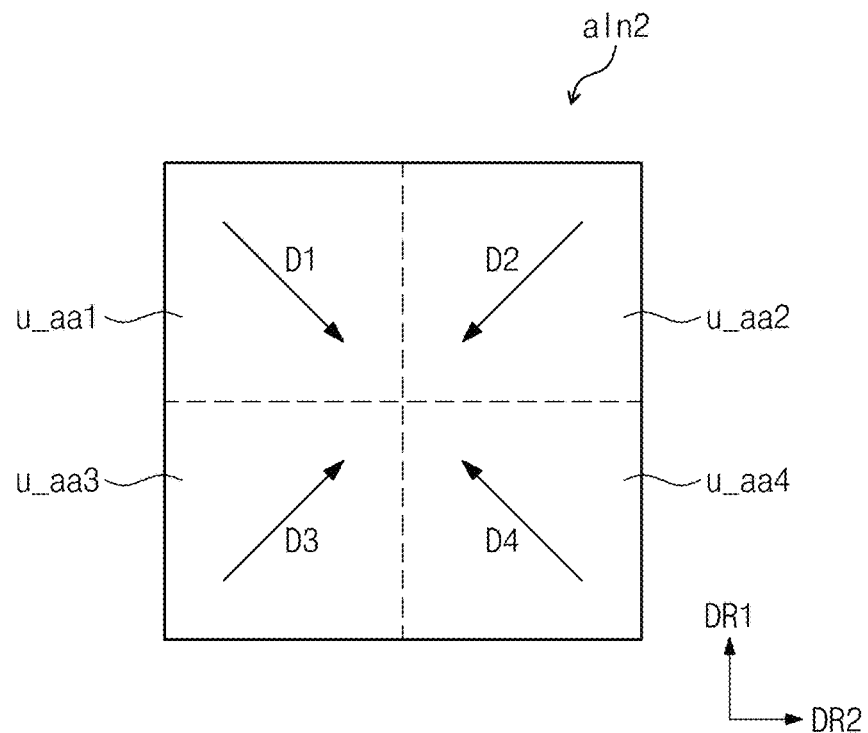
FIG. 7D is a plan view showing the second alignment layer when viewed from the direction DR5 of FIG. 7B.
Figure 7E:
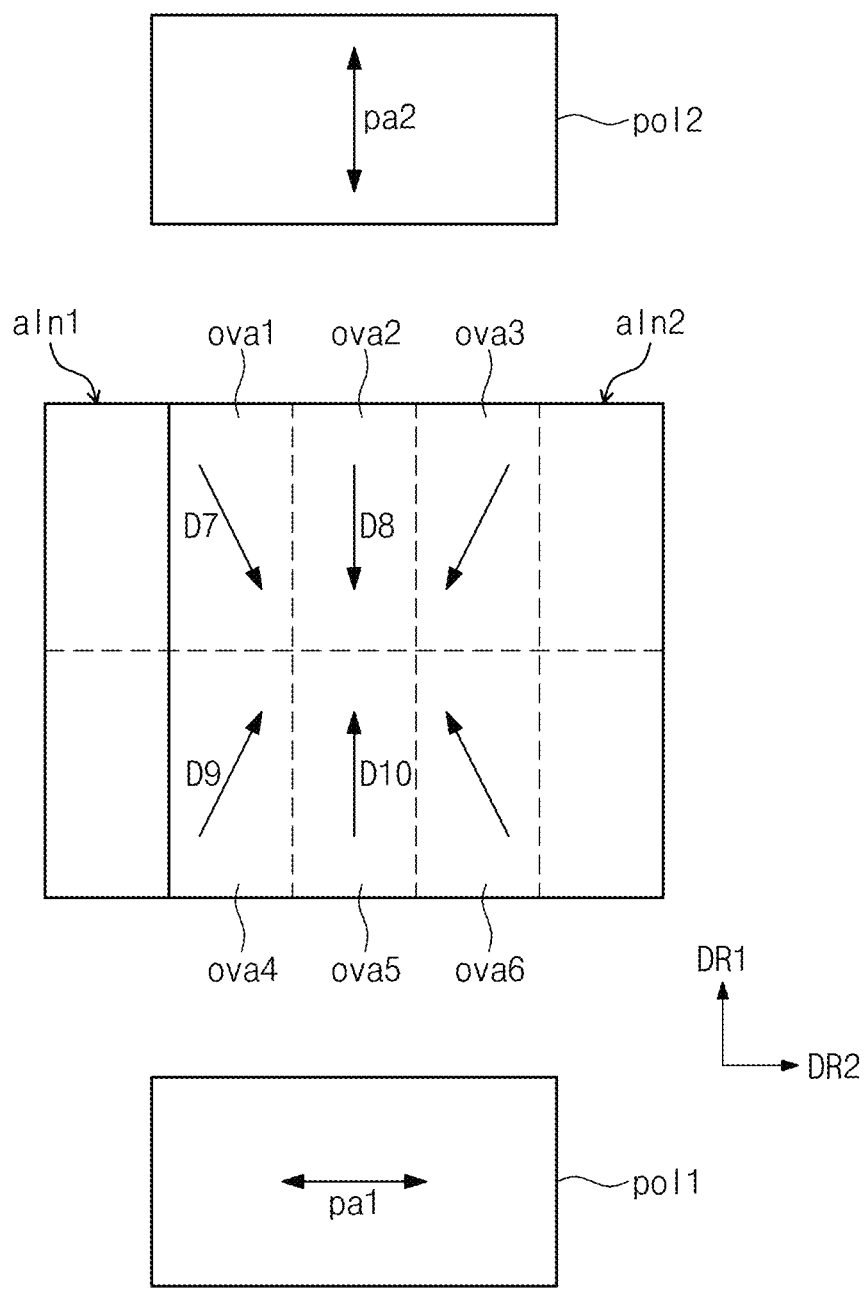
FIG. 7E is a plan view showing an area in which the first and second alignment layers are overlapped with each other when viewed from a third direction of FIG. 7B.

FIG. 7A is a perspective view showing a curved display device 1000 according to a comparison example. FIG. 7B is a perspective view showing a pixel px and first and second alignment layers aln1 and aln2 corresponding to the pixel, which are included in the comparative curved display device. FIG. 7C is a plan view showing the first alignment layer aln1 when viewed from a direction DR5 of FIG. 7B. FIG. 7D is a plan view showing the second alignment layer aln2 when viewed from the direction DR5 of FIG. 7B. FIG. 7E is a plan view showing an area in which the first and second alignment layers aln1 and aln2 overlap each other when viewed from a third direction of FIG. 7B.

Referring to FIGS. 7A to 7E, the curved display device 1000 of the comparison example includes a first alignment layer aln1 containing reactive mesogens polymerized with each other and a second alignment layer aln2 containing reactive mesogens polymerized with each other. The first and second alignment layers aln1 and aln2 may include the same polymerized reactive mesogen. Accordingly, first liquid crystal molecules on the first alignment layer aln1 are pretilted and the second liquid crystal molecules on the second alignment layer aln2 are pretilted. A pretilt angle of the first liquid crystal molecules may be substantially the same as a pretilt angle of the second liquid crystal molecules.

When an electric field is applied to a liquid crystal layer lcl, the first liquid crystal molecules on lower alignment areas l_aa1, l_aa2, l_aa3, and l_aa4 are horizontally aligned in the same direction as that in which the second liquid crystal molecules on upper alignment areas u_aa1, u_aa2, u_aa3, and u_aa4 are horizontally aligned. Since both the first and second liquid crystal molecules are pretilted, the speed at which the first liquid crystal molecules are horizontally aligned is substantially similar to the speed at which the second liquid crystal molecules are horizontally aligned.

In more detail, when the electric field is applied to the liquid crystal layer lcl due to a driving voltage, the first liquid crystal molecules on the first lower alignment area l_aa1 and the second liquid crystal molecules on the first upper alignment area u_aa1 are horizontally aligned in the first sub-direction D1 and are substantially parallel to the first sub-direction D1; the first liquid crystal molecules on the second lower alignment area l_aa2 and the second liquid crystal molecules on the second upper alignment area u_aa2 are horizontally aligned in the second sub-direction D2 and are substantially parallel to the second sub-direction D2; the first liquid crystal molecules on the third lower alignment area l_aa3 and the second liquid crystal molecules on the third upper alignment area u_aa3 are horizontally aligned in the third sub-direction D3 and are substantially parallel to the third sub-direction D3; and the first liquid crystal molecules on the fourth lower alignment area l_aa4 and the second liquid crystal molecules on the fourth upper alignment area u_aa4 are horizontally aligned in the fourth sub-direction D4 and are substantially parallel to the fourth sub-direction D4.

Referring to FIG. 7D, when viewed in the third direction DR3, the first and second alignment layers aln1 and aln2 include overlap areas ova1, ova2, ova3, ova4, ova5, and ova6, each in which the first alignment layer aln1 is overlapped with the second alignment layer aln2. The overlap areas ova1, ova2, ova3, ova4, ova5, and ova6 include a first overlap area ova1, a second overlap area ova2, a third overlap area ova3, a fourth overlap area ova4, a fifth overlap ova5, and a sixth overlap area ova6.

In the curved display device 1000, the first and second liquid crystal molecules are pretilted in the second overlap area ova2. Therefore, a direction of the optical axis of the liquid crystal layer lcl in the second overlap area ova2 is substantially parallel to an eighth sub-direction D8 obtained by summing the first and second sub-directions D1 and D2. Similarly, a direction of an optical axis of the liquid crystal layer lcl in the fifth overlap area ova5 is substantially parallel to a tenth sub-direction D10 obtained by summing the third and fourth sub-directions D3 and D4.

The curved display device 1000 includes a lower polarizing plate pol1 and an upper polarizing plate pol2. The first transmission axis pa1 of the lower polarizing plate pol1 is substantially perpendicular to a second transmission axis pa2 of the upper polarizing plate pol2. For instance, when the first transmission axis pa1 of the lower polarizing plate pol1 is substantially parallel to the second direction DR2, the second transmission axis pa2 of the upper polarizing plate pol2 is substantially parallel to the first direction DR1. The first direction DR1 may be substantially parallel to the eighth sub-direction D8 or the tenth sub-direction D10.

Thus, when the driving voltage is applied and the electric field is formed in the liquid crystal layer lcl, the direction of the optical axis of the liquid crystal layer lcl is substantially parallel to the direction of the first transmission axis pa1 of the lower polarizing plate pol1 or to the direction of the second transmission axis pa2 of the upper polarizing plate pol2, in each of the second and sixth overlap areas ova2 and ova6.

When the direction of the first transmission axis pa1 of the lower polarizing plate pol1 is substantially parallel to the direction of the optical axis of the liquid crystal layer lcl in each of the second and sixth overlap areas ova2 and ova6, the light transmitting through the lower polarizing plate pol1 is blocked by the second transmission axis pa2 of the upper polarizing plate pol2 after passing through the second and sixth overlap areas ova2 and ova6.

In addition, when the direction of the second transmission axis pa2 of the upper polarizing plate pol2 is substantially parallel to the direction of the optical axis of the liquid crystal layer lcl in each of the second and sixth overlap areas ova2 and ova6, the light transmitting through the lower polarizing plate pol1 does not transmit through the second and sixth overlap areas ova2 and ova6. Accordingly, the user may not perceive the light in the second and sixth overlap areas ova2 and ova6.

That is, according to the curved display device 1000 of the comparison example, the first liquid crystal molecules on the lower alignment areas of the first alignment layer and the second liquid crystal molecules on the upper alignment areas of the second alignment layer are aligned in the same direction, and the user does not perceive the light in the case where the first and second substrates are curved. As a result, texture defects occur in which a dark area is perceived in the pixel.

However, according to the exemplary curved display device described with reference to FIGS. 6A to 6F, the first liquid crystal molecules are pretilted at the first pretilt angle, but the second liquid crystal molecules are not pretilted and have a second pretilt angle different from the first pretilt angle. Therefore, the texture defects do not occur in the exemplary curved display device according to the present disclosure even when the first and second substrates are curved. As a result, the display quality of the exemplary curved display device according to the present disclosure may be improved.

In addition, the amount of non-reacted, residual reactive mesogens which remain in the curved display device is reduced in accordance with the use of the photo-initiator, and thus defects caused by the residual reactive mesogens are reduced. Further, since the photo-initiator increases the reaction speed of the reactive mesogens, the process time required to form the alignment layers is shortened.

Figure 8:
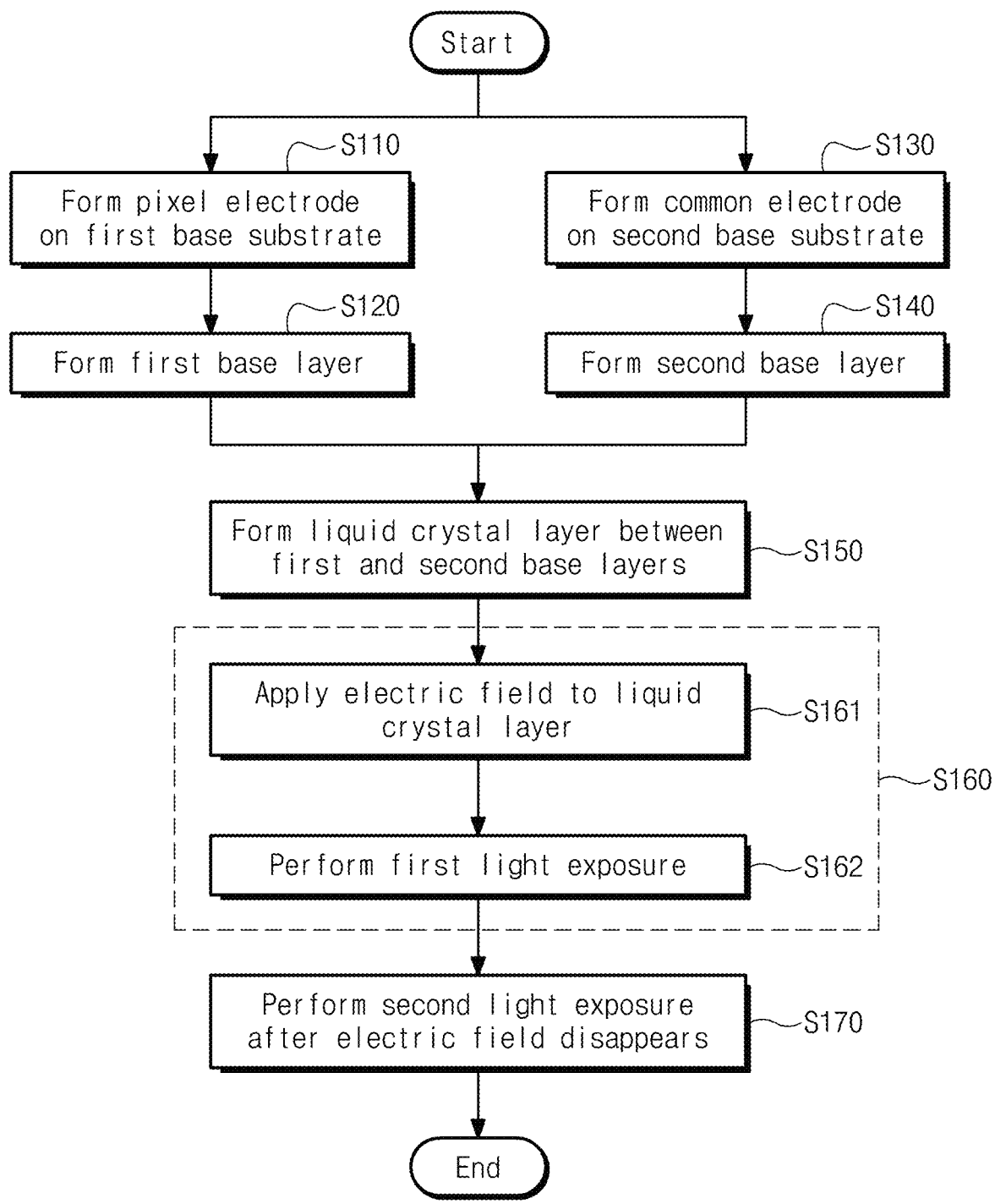
FIG. 8 is a flowchart of an exemplary method of manufacturing a curved display device according the present disclosure.

FIG. 8 is a flowchart showing an exemplary embodiment of a method of manufacturing the curved display device according to the present disclosure.

Referring to FIG. 8, to manufacture the curved display device, the pixel electrode is formed on the first base substrate (S110) and the first base layer is formed on the first base substrate (S120). Separately, the common electrode is formed on the second base substrate (S130) and the second base layer is formed on the second base substrate (S140). Then, the liquid crystal layer is formed between the first base layer and the second base layer (S150). The liquid crystal layer includes the reactive mesogens. After that, the electric field is applied to the liquid crystal layer (S161), and substantially simultaneously, a first light exposure process is performed on the liquid crystal layer (S162) to form the alignment forming layer (S160). Then, a second light exposure process is performed on the liquid crystal layer after the electric field is removed (S170).

Figure 9A:
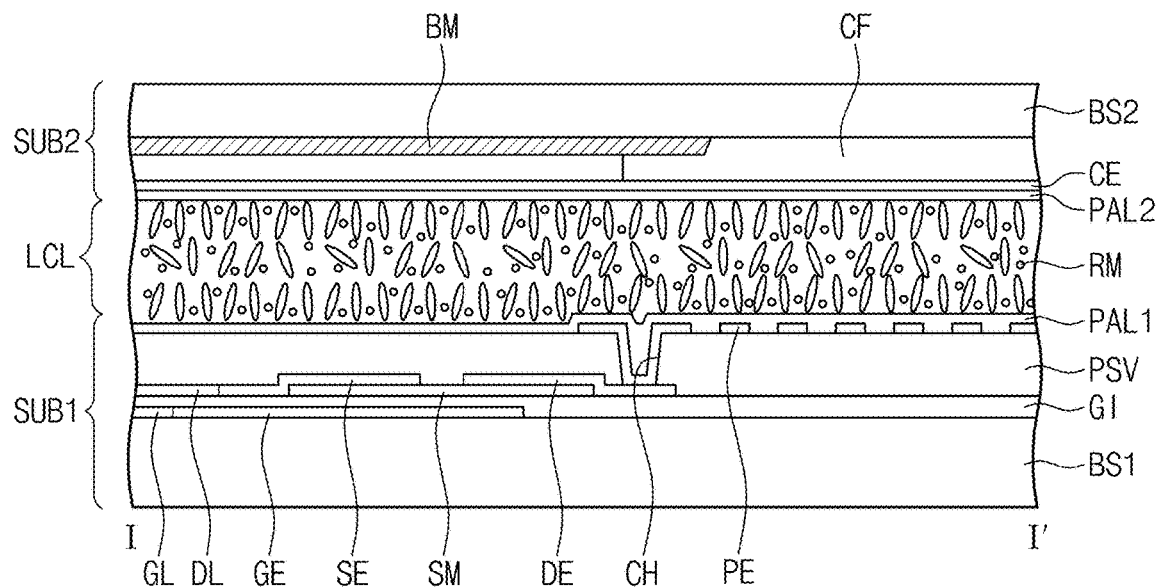
FIGS. 9A, 9B, and 9C are cross-sectional views showing an exemplary method of manufacturing a curved display device according to the present disclosure.
Figure 9B:
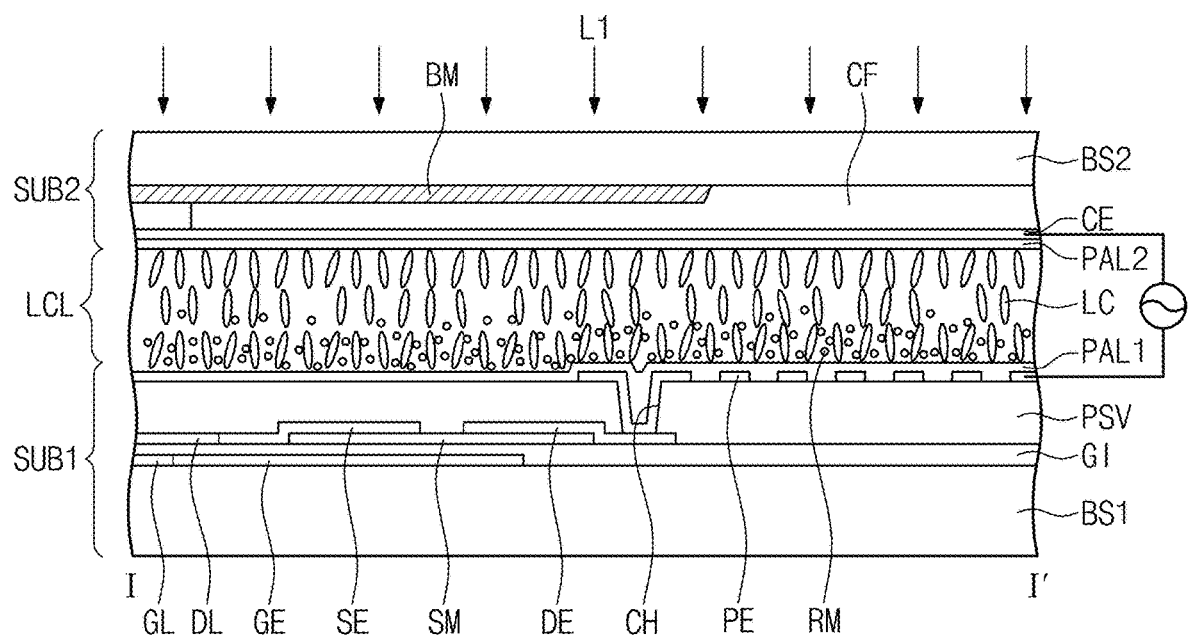
Figure 9C:
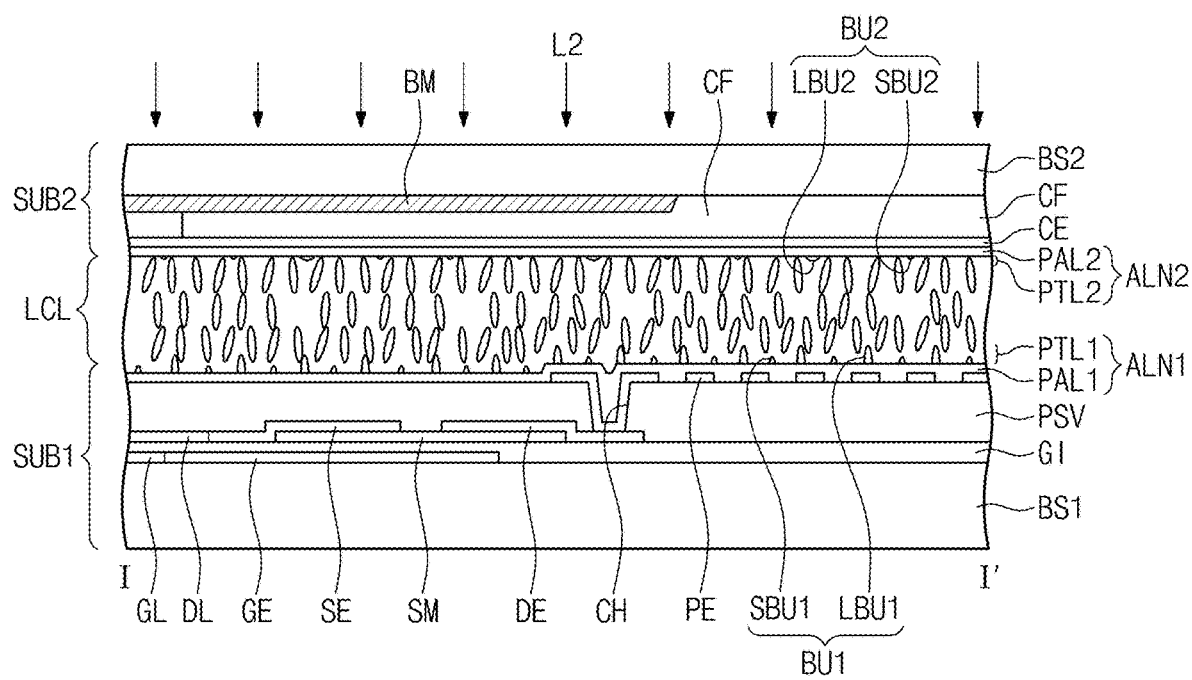

FIGS. 9A, 9B, and 9C are cross-sectional views showing a method of manufacturing an exemplary embodiment of a curved display device according to the present disclosure.

Referring to FIGS. 1A, 1B, 2 to 8, 9A, 9B, and 9C, the pixel electrode PE is provided on the first base substrate BS1.

A gate pattern is formed on the first base substrate BS1. The gate pattern includes the gate lines GL and the storage electrode part. The gate pattern is formed by a photolithography process. The gate insulating layer GI is formed on the gate pattern. The semiconductor pattern SM is formed on the gate insulating layer GI. The semiconductor pattern SM includes the active pattern (not shown) and the ohmic contact layer (not shown) formed on the active pattern. The semiconductor pattern SM is formed using a photolithography process. A data pattern is formed on the semiconductor pattern SM. The data pattern includes the data lines DL, the source electrode SE, and the drain electrode DE. The data pattern is formed by a photolithography process. The semiconductor pattern SM and the data pattern are formed using a half mask or a diffraction mask. The protective layer PSV is formed on the data pattern. The protective layer PSV includes a contact hole CH defined therein and through which the portion of the drain electrode DE is exposed. The protective layer PSV is formed using a photolithography process. The pixel electrode PE is formed on the protective layer PSV and connected to the drain electrode DE through the contact hole CH. The pixel electrode PE is formed using a photolithography process.

Then, the first base layer PAL1 is formed on the first base substrate BS1. The first base layer PAL1 is formed by coating the first alignment solution on the first base substrate BS1 and heating the first alignment solution.

The first alignment solution includes the first alignment agent, the photo-initiator, and the solvent. The first alignment agent is polymerized to form the first base layer PAL1 and the photo-initiator initiates the photo-polymerization of the reactive mesogens. The alignment agent includes a monomer of the polymer, in which the polymer includes at least one of polyimide, polyamic acid, polyamide, polyamic imide, polyester, polyethylene, polyurethane, polystyrene, etc., a dimer, an oligomer, and a mixture thereof.

In an exemplary embodiment, the first alignment agent may further include an additive. In an exemplary embodiment, the additive is an antioxidant, to prevent the liquid crystal molecules LC from being oxidized.

The photo-initiator, includes at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro-acetophenone, α-chloro-thioxanthone, and benzoin alkylether, etc.

Commercially available photo-initiators may be used, such as Irgacure® 651, Irgacure® 127, Irgacure® 754, Irgacure® 819, Irgacure® 784, Irgacure® 907, Irgacure® 369, Irgacure® 379, Irgacure® 2959, Irgacure® OXE01, Irgacure® OXE02, Darocure® TPO, which are manufactured by BASF Co., Ltd.

In an exemplary embodiment, the photo-initiator is provided in amounts of about 0.001 parts by weight to about 2 parts by weight, or in amounts of about 0.001 parts by weight to about 1 part by weight, per 100 parts by weight of the first alignment agent. The amount of the photo-initiator is dependent upon the type of the photo-initiator used and the wavelength that initiates the photo-reaction. For instance, when the photo-initiator is Irgacure® 651, the photo-initiator is provided in amounts of about 0.05 parts by weight; when the photo-initiator is Irgacure® 127, the photo-initiator is provided in amounts of about 0.1 parts by weight; when the photo-initiator is Irgacure® 754, the photo-initiator is provided in amounts of about 0.2 parts by weight; when the photo-initiator is Irgacure® 819, the photo-initiator is provided in amounts of about 0.01 parts by weight to about 0.1 parts by weight; when the photo-initiator is Irgacure® 784, the photo-initiator is provided in amounts of about 0.1 parts by weight; when the photo-initiator is Irgacure® 907, the photo-initiator is provided in amounts of about 0.001 parts by weight to about 0.1 parts by weight; when the photo-initiator is Irgacure® 369, the photo-initiator is provided in amounts of about 0.001 parts by weight to about 0.1 parts by weight; when the photo-initiator is Irgacure® 379, the photo-initiator is provided in amounts of about 0.001 parts by weight to about 0.1 parts by weight; when the photo-initiator is Irgacure® 2959, the photo-initiator is provided in amounts of about 0.001 parts by weight to about 0.1 parts by weight; when the photo-initiator is Irgacure® OXE01, the photo-initiator is provided in amounts of about 0.01 parts by weight; when the photo-initiator is Irgacure® OXE02, the photo-initiator is provided in amounts of about 0.01 parts by weight; and when the photo-initiator is Darocure® TPO, the photo-initiator is provided in amounts of about 0.01 parts by weight.

The solvent is not limited to a specific material as long as the solvent is mixed with the first alignment agent and the reactive mesogens to form the alignment solution. In an exemplary embodiment, the solvent may include at least one of γ-butyrolactone, ethylene glycol butyl ether, and N-methylpyrrolidone, or a mixture obtained by mixing at least two of γ-butyrolactone, ethylene glycol butyl ether, and N-methylpyrrolidone.

The first alignment solution is polymerized by heat, and thus the first alignment solution is cured to form the first base layer PAL1. Since the first alignment solution is formed through a heat curing process, at least the portion of the photo-initiator does not react, so that at least the portion of the photo-initiator remains in the first alignment solution.

Hereinafter, the method of forming the second substrate SUB2 will be described in detail.

The color filter CF is formed on the second base substrate BS2 to represent the colors. The common electrode CE is formed on the color filter CF. The color filter CF and the common electrode CE are formed using a photolithography process, but the process is not limited thereto or thereby.

The second base layer PAL2 is formed on the second base substrate BS2 on which the common electrode CE is formed. The second base layer PAL2 is formed by coating the second alignment solution on the second base substrate BS1 and heating the second alignment solution.

The second alignment solution includes a second alignment agent and the solvent. The second alignment solution is polymerized to form the second base layer PAL2. The second alignment solution does not contain the photo-initiator contained in the first alignment solution.

The alignment agent includes a monomer of the polymer, in which the polymer includes at least one of polyimide, polyamic acid, polyamide, polyamic imide, polyester, polyethylene, polyurethane, polystyrene, etc., a dimer, an oligomer, and a mixture thereof.

The solvent is not limited to a specific material as long as the solvent is mixed with the second alignment agent and the reactive mesogens to form the second alignment solution. In the present exemplary embodiment, the solvent may be at least one of γ-butyrolactone (γ-BL), ethylene glycol butyl ether (BCS), and N-methylpyrrolidone (NMP), and a mixture obtained by mixing at least two of γ-BL, BCS, and NMP.

The second alignment solution is polymerized by heat, and thus the second alignment solution is cured to form the second base layer PAL2.

Then, as shown in FIG. 9A, the first substrate SUB1 and the second substrate SUB2 are disposed to face each other and a liquid crystal composition is provided between the first and second substrates SUB1 and SUB2 to form the liquid crystal layer LCL.

The liquid crystal layer LCL includes the liquid crystal molecules LC having dielectric anisotropy and the liquid crystal composition including the reactive mesogens RM having a light absorption peak at a predetermined wavelength.

The liquid crystal molecules LC have negative dielectric anisotropy, but are not limited thereto or thereby. That is, the liquid crystal molecules LC may have the positive dielectric anisotropy.

The term "reactive mesogens RM" or "reactive mesogen" used herein means a photocrosslinkable low molecular weight or high molecular weight copolymer including a mesogen group having a liquid crystal property. Examples of suitable reactive mesogens RM are those including acrylate, methacrylate, epoxy, oxetane, vinyl ether, or styrene. In addition, the reactive mesogens RM may be a material having a bar shaped structure, a banana shaped structure, a board shaped structure, or a disc shaped structure.

The polymerization reaction is initiated by the photo-initiator. For instance, when the photo-initiator contains a benzyl dimethyl ketal group, the polymerization reaction occurs by applying a light having the wavelength of about 340 nm. The polymerization reaction of the reactive mesogens RM is initiated by the polymerization reaction of the photo-initiator, thereby causing a chain reaction. When the photo-initiator is present only in one side portion, e.g., the first substrate, the polymerization reaction of the reactive mesogens RM in the one side portion occurs much faster than the polymerization reaction of the reactive mesogens RM in the other side portion in which the photo-initiator is not present. Accordingly, when the photo-initiator is provided to only the first base layer PAL1, the first alignment forming layer PTL1 may be formed only on the first base substrate BS1.

In an exemplary embodiment, the reactive mesogens RM are not limited to specific reactive mesogens as long as the polymerization reaction of the reactive mesogens RM is initiated by the photo-initiator at the predetermined wavelength. The reactive mesogens RM are selected from compounds having a structure represented by following chemical formula 3.

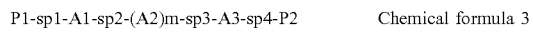

P1-sp1-A1-sp2-(A2)m-sp3-A3-sp4-P2  Chemical formula 3

In the above Chemical formula 3, "P1" denotes an end group containing two to six reaction groups that cause the polymerization reaction. The P1 reaction groups may be an acrylate group, a methacrylate group, an epoxy group, an oxetane group, a vinyl-ether group, or a styrene group. "P2" is independently provided from "P1" and denotes an end group containing two to six reaction groups that cause the polymerization reaction. The P2 reaction groups may be, an acrylate group, a methacrylate group, an epoxy group, an oxetane group, a vinyl ether group, or a styrene group. "Sp1", "Sp2", "Sp3", and "Sp4" are independently a single bond or a spacer group including at least one of $-CH_2-$, $-COO-$, $-CO-CH=CH-$, $-COO-CH=CH-$, $-CH_2OCH_2-$, and $-CH_2O-$. "A1" and "A3" are independently a single bond, a cyclohexyl group, a phenyl group, a thiophenyl group, and a polycyclic aromatic group. "A2" is a cyclohexyl group, a phenyl group, a thiophenyl group, and a polycyclic aromatic hydrocarbon group. In Chemical formula 3, "m" is 1 to 4.

Figure 10:
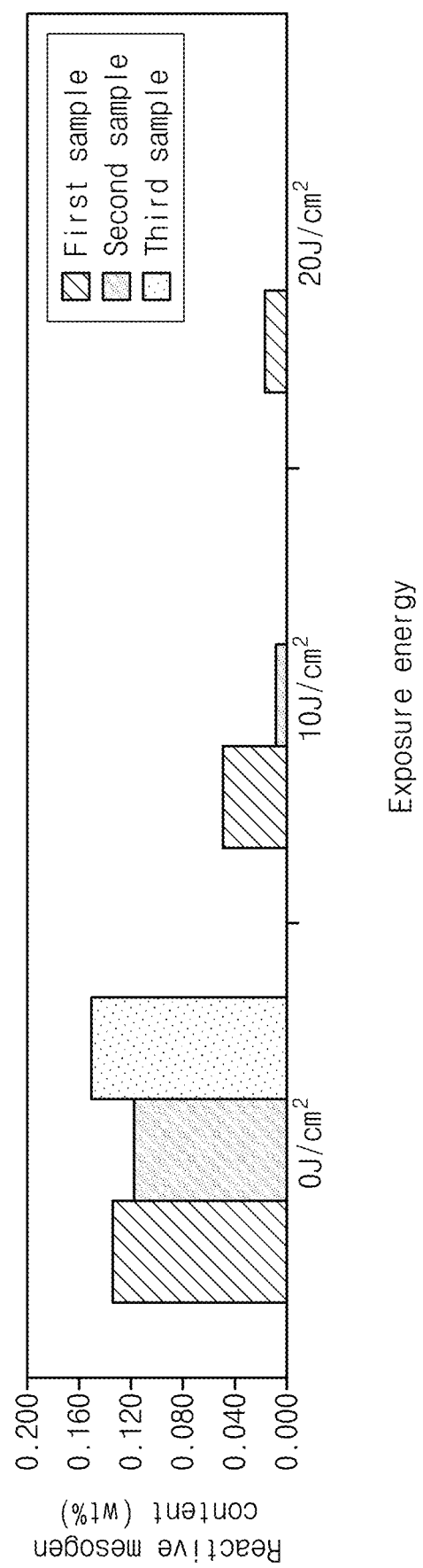
FIG. 10 is a graph illustrating the reactive mesogen content in a liquid crystal layer as a function of the first light exposure energy measured when the photo-initiator is or is not present.

FIG. 10 is a graph illustrating the reactive mesogen content in the liquid crystal layer as a function of the first light exposure energy, for cases where the photo-initiator is either present or is not present. In FIG. 10, the first sample represents a case in which no photo-initiator is included in the first and second base layers, the second sample represents a case in which the photo-initiator is included only in the first alignment layer, and the third sample represents a case in which a photo-initiator which is different from the photo-initiator included in the first sample alignment layer is included in the first main alignment layer.

Referring to FIG. 10, the reactive mesogens included in the liquid crystal layer are polymerized following the light exposure, and thus the percentage of reactive mesogens is reduced in the liquid crystal layer. However, the reduction in reactive mesogen content in the first sample including no photo-initiator was smaller than the reduction of the reactive mesogen content observed in the second and third samples including the photo-initiator. This means that the reaction speed of the reactive mesogens is much faster when the photo-initiator is included in the liquid crystal layer as compared to the reaction speed of the reactive mesogens when the photo-initiator is not included in the liquid crystal layer.

The following Table 1 represents the reduction in content of the reactive mesogens in the liquid crystal layer due to the first light exposure when the photo-initiator exists in the first main alignment layer. In the following Table 1, various photo-initiators are used, but the kind of photo-initiators and the other elements are maintained without variation. As shown in the following Table 1, when the photo-initiator is present in the liquid crystal layer, the content of the reactive mesogens is extremely reduced in the liquid crystal layer as the amount of light exposure energy increases.

TABLE 1

| Photo-initiator | Applied energy (J) | Reactive mesogen content (wt %) | Percentage (wt %) | ppm (parts per million) |
| --- | --- | --- | --- | --- |
| Irgacure 127 | 0 J | 0.170 | 85.2 | 1704 |
| | 10 J | 0.025 | 12.3 | 247 |
| | 20 J | 0.012 | 6.1 | 123 |
| | 30 J | 0.006 | 3.1 | 61 |
| | 40 J | 0.005 | 2.5 | 49 |
| | 50 J | 0.003 | 1.6 | 32 |
| | 60 J | 0.003 | 1.5 | 30 |
| | 70 J | Less than detection limit | — | — |
| Irgacure 369 | 0 J | 0.147 | 73.4 | 1468 |
| | 10 J | 0.026 | 12.9 | 259 |
| | 20 J | 0.011 | 5.6 | 113 |
| | 30 J | 0.005 | 2.6 | 53 |
| | 40 J | 0.004 | 2.0 | 39 |
| | 50 J | 0.003 | 1.4 | 28 |
| | 60 J | Less than detection limit | — | — |
| | 70 J | Less than detection limit | — | — |
| Irgacure 651 | 0 J | 0.188 | 94.2 | 1885 |
| | 10 J | 0.027 | 13.3 | 267 |
| | 20 J | 0.013 | 6.3 | 125 |
| | 30 J | 0.006 | 3.1 | 62 |
| | 40 J | 0.005 | 2.5 | 50 |
| | 50 J | 0.004 | 2.0 | 40 |
| | 60 J | 0.004 | 1.8 | 36 |
| | 70 J | Less than detection limit | — | — |
| Irgacure 819 | 0 J | 0.150 | 75.0 | 1501 |
| | 10 J | 0.023 | 11.5 | 231 |
| | 20 J | 0.010 | 5.2 | 105 |
| | 30 J | 0.007 | 3.3 | 67 |
| | 40 J | 0.004 | 2.0 | 40 |
| | 50 J | 0.003 | 1.6 | 31 |
| | 60 J | Less than detection limit | — | — |
| | 70 J | Less than detection limit | — | — |

Referring to FIG. 10 and Table 1, since the photo-initiator is included only in the first base layer, the polymerization reaction speed of the reactive mesogens in the first base layer is much faster than the reaction speed in the second base layer. Accordingly, the polymerization reaction of the reactive mesogens mainly occurs between the first base layer and the liquid crystal layer, and the occurrence of the polymerization reaction of the reactive mesogens between the second base layer and the liquid crystal layer is relatively smaller than that occurring between the first base layer and the liquid crystal layer. Therefore, the alignment forming layer substantially is not formed on the second base layer, and the alignment of the liquid crystal molecules is not influenced even though the alignment forming layer is formed on the second base layer.

Referring to FIG. 9B, the electric field is applied to the liquid crystal composition. The electric field is formed by respectively applying a voltage to the pixel electrode PE and the common electrode CE. Then, a first light L1 is irradiated onto the liquid crystal layer LCL to perform the first light exposure on the liquid crystal layer LCL while the electric field is simultaneously applied to the liquid crystal composition.

The first light L1 has a wavelength longer than that of a second light L2 (refer to FIG. 9C). The first light L1 may be, but is not limited to, an ultraviolet light having a wavelength of about 10 nm to about 400 nm. According to another embodiment, the first light L1 may have a wavelength of about 220 nm to about 350 nm, corresponding to the maximum absorption wavelength of the reactive mesogens RM. The first light L1 may be polarized or unpolarized.

In an exemplary embodiment, the first light L1 is irradiated on the liquid crystal composition at an applied (exposure) energy of about 0.1 joules per square centimeter ($J/cm^2$) to about 50 $J/cm^2$ for a time period of about 30 seconds to about 300 seconds. However, the applied energy and the time period vary depending on the type of reactive mesogens RM.

When the first light L1 is irradiated to the liquid crystal layer LCL, the first alignment forming layer PTL1 (see FIG. 9C) is formed on the first base layer PAL1, but is not formed on the second base layer PAL2. Since the polymerization reaction of the reactive mesogens RM is initiated by the photo-initiator and since the photo-initiator is provided only from the first base layer PAL1, the polymerization reaction of the reactive mesogens RM mainly occurs between the first base layer PAL1 and the liquid crystal layer LCL, but does not occur between the second base layer PAL2 and the liquid crystal layer LCL.

In more detail, when the electric field is applied to the liquid crystal molecules LC, the reactive mesogens RM are aligned in the same direction as the liquid crystal molecules LC which are disposed in the vicinity of the reactive mesogens RM. Then, when the first light L1 is provided, the reaction of the photo-initiator occurs before the polymerization reaction of the reactive mesogens RM occurs as a chain reaction. As a result, the reactive mesogens RM are polymerized to each other by the first light L1 and a network structure is formed from the reactive mesogens RM. The reactive mesogens RM are coupled with (crosslinked to) adjacent reactive mesogens to form side chains. In these conditions, the reactive mesogens RM have a specific directivity in an average alignment direction of the liquid crystal molecules LC since the reactive mesogens RM form the network structure after the liquid crystal molecules LC are aligned. Therefore, although the electric field disappears, the liquid crystal molecules LC disposed in the vicinity of the network structure have the pretilt angle.

Referring to FIG. 9C, after the electric field has been removed (disappears), the second light L2 having a wavelength shorter than that of the first light L1 is irradiated on the liquid crystal composition to perform the second light exposure on the liquid crystal composition.

The second light L2 may be, but is not limited to, an ultraviolet light and have a wavelength of about 10 nm to about 400 nm. According to another embodiment, the second light L2 may have a wavelength of about 220 nm to about 350 nm. The second light L2 may be polarized or unpolarized.

In an exemplary embodiment, the second light L2 has a brightness of about 0.05 milliwatt per square centimeter ($mW/cm^2$) to about 0.6 $mW/cm^2$ and is irradiated on the liquid crystal composition for a time period of about 10 minutes to about 90 minutes. However, the brightness and the time period vary depending on the type of reactive mesogens RM used. When the second light L2 is irradiated on the first alignment forming layer PTL1 during the second light exposure period, sites of the first alignment forming layer PTL1, which were not previously reacted, are completely reacted, and thus the first alignment forming layer PTL1 becomes stabilized.

Thus, the curved display device including the first alignment forming layer PTL1 may be manufactured through the above-mentioned method.

In the present exemplary embodiment, the manufacturing method of the curved display device may further include allowing the first and second substrates to be curved in one direction after exposure to the second light has been completed. According to another exemplary embodiment, the manufacturing method of the curved display device may further include allowing the first and second substrates to be curved prior to forming the first and second base layers.

EXAMPLES

Embodiment Example 1

The first base substrate was prepared and the first base layer was formed on the first base substrate using the first alignment solution containing the photo-initiator. The second base substrate was prepared and the second base layer was formed on the second base substrate using the second alignment solution which did not contain the photo-initiator. The liquid crystal composition containing the reactive mesogens was provided between the first and second base substrates and the light and the electric field were simultaneously applied to the liquid crystal composition in order to form the first alignment layer including the first large-size protrusions and the second alignment layer including the second large-size protrusions. The curved display device was manufactured through the above-mentioned processes. Two samples of the first alignment layer in embodiment example 1 were collected (designated sample #1 and sample #2, respectively), and two samples of the second alignment layer in embodiment example 1 were also collected (designated sample #3 and sample #4).

Comparison Example 1

The curved display device was manufactured through the same processes as those described for embodiment example 1 except that the photo-initiator was not used when the first base layer was formed. Two samples of the first alignment layer of comparison example 1 were collected (designated sample #5 and sample #6), and two samples of the second alignment layer of comparison example 1 were also collected (designated sample #7 and sample #8).

1. Measurement of Embodiment Example 1 and Comparison Example 1

1) AFM Measurement

Figure 11:
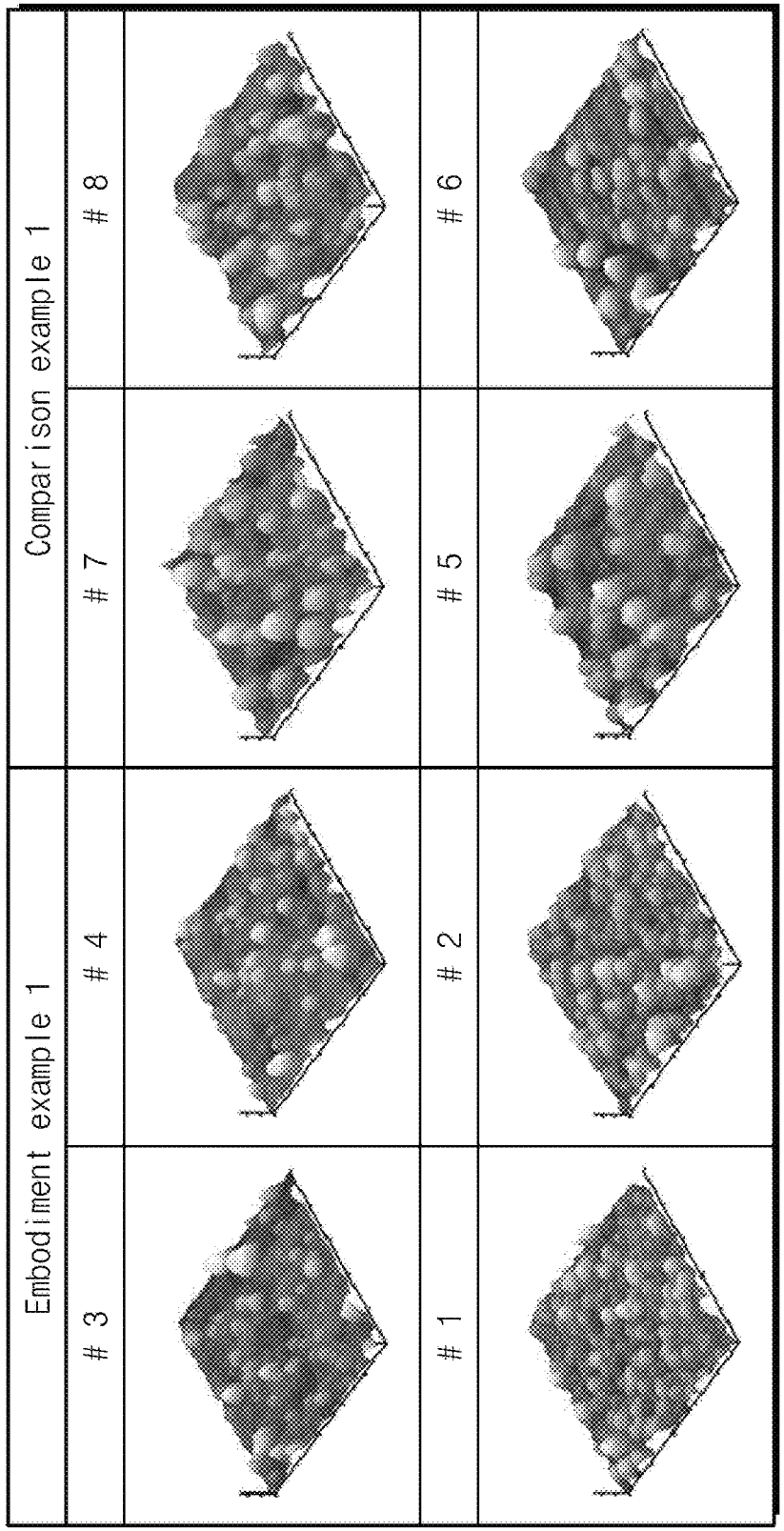
FIG. 11 is a table showing atomic force microscopy ("AFM") images of embodiment example 1 and a comparison example 1.

AFM images of samples #1, #2, #3, and #4 of the embodiment example 1 and images of samples #5, #6, #7, and #8 of comparison example 1 were measured by using an AFM (atomic force microscope) STA-500. The measured AFM images are shown in FIG. 11.

2) Measurement of Distribution of the Large-Size Protrusions

1) Measurement of the Distribution of the Large-Size Protrusions Each Having a Particle Size Equal to or Greater than about 30 nm in Diameter.

Figure 12:
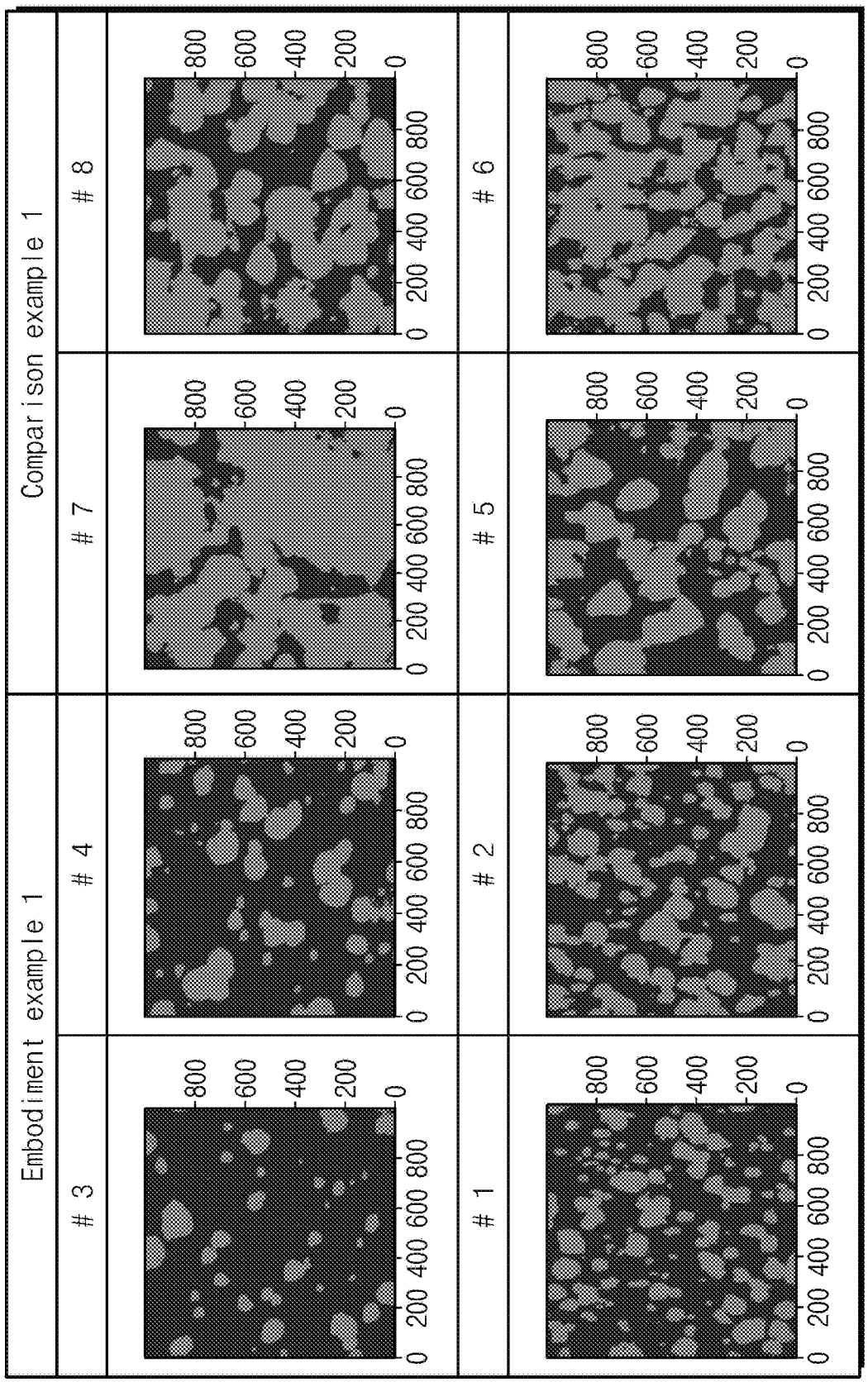
FIG. 12 is a table showing the distribution area of large-size protrusions, each having a particle size of about 30 nm or more in diameter, in the AFM images of embodiment example 1 and comparison example 1.

On the basis of the measured AFM images, the areas in which the first large-size protrusions each having the particle size equal to or greater than about 30 nm in diameter were distributed was measured in samples #1 and #2 of embodiment example 1 and samples #5 and #6 of comparison example 1. The areas in which the second large-size protrusions each having the particle size equal to or greater than about 30 nm were distributed, was measured in samples #3 and #4 of embodiment example 1 and samples #7 and #8 of comparison example 1. The results are shown in FIG. 12. In FIG. 12, the areas in which the first large-size protrusions or the second large-size protrusions were distributed are indicated by a grey color. The areas, in which there are no first large-size protrusions or second large-size protrusions, are indicated by a black color.

2) Analysis of Distributions of the Second Large-Size Protrusions and the First Large-Size Protrusions ① Analysis of the distribution of the large-size protrusions each having the particle size equal to or greater than about 30 nm in diameter.

Table 2 shows the size of the area in which the second large-size protrusions each having the particle size equal to or greater than about 30 nm are distributed in the measured AFM images and the size of area in which the first large-size protrusions each having the particle size equal to or greater than about 30 nm are distributed in the measured AFM images. In each of the AFM images, the sum of the size of the area in which the first large-size protrusions are distributed and the size of the area in which the first large-size protrusions are not distributed is about $1.0 \times 10^6$ $nm^2$. In addition, in each of the AFM images, the sum of the size of the area in which the second large-size protrusions are distributed and the size of the area in which the second large-size protrusions are not distributed is about $1.0 \times 10^6$ $nm^2$.

TABLE 2

| Embodiment example 1 | Size of area in which the protrusions are distributed ($nm^2$) | Size of area in which the protrusions are not distributed ($nm^2$) | Number of first or second large-size protrusions | Comparison example 1 | Size of area in which the protrusions are distributed ($nm^2$) | Size of area in which the protrusions are not distributed ($nm^2$) |
|---|---|---|---|---|---|---|
| #3 | $1.489 \times 10^5$ | $8.511 \times 10^5$ | 43 | #7 | $8.046 \times 10^5$ | $1.954 \times 10^5$ |
| #4 | $2.605 \times 10^5$ | $7.395 \times 10^5$ | 55 | #8 | $6.056 \times 10^5$ | $3.944 \times 10^5$ |
| #1 | $3.471 \times 10^5$ | $6.529 \times 10^5$ | 104 | #5 | $4.983 \times 10^5$ | $5.017 \times 10^5$ |
| #2 | $4.572 \times 10^5$ | $5.428 \times 10^5$ | 71 | #6 | $6.755 \times 10^5$ | $3.245 \times 10^5$ |

2) Measurement of Distribution of the Large-Size Protrusions Each Having a Particle Size Equal to or Greater than about 50 nm in Diameter.

Figure 13:
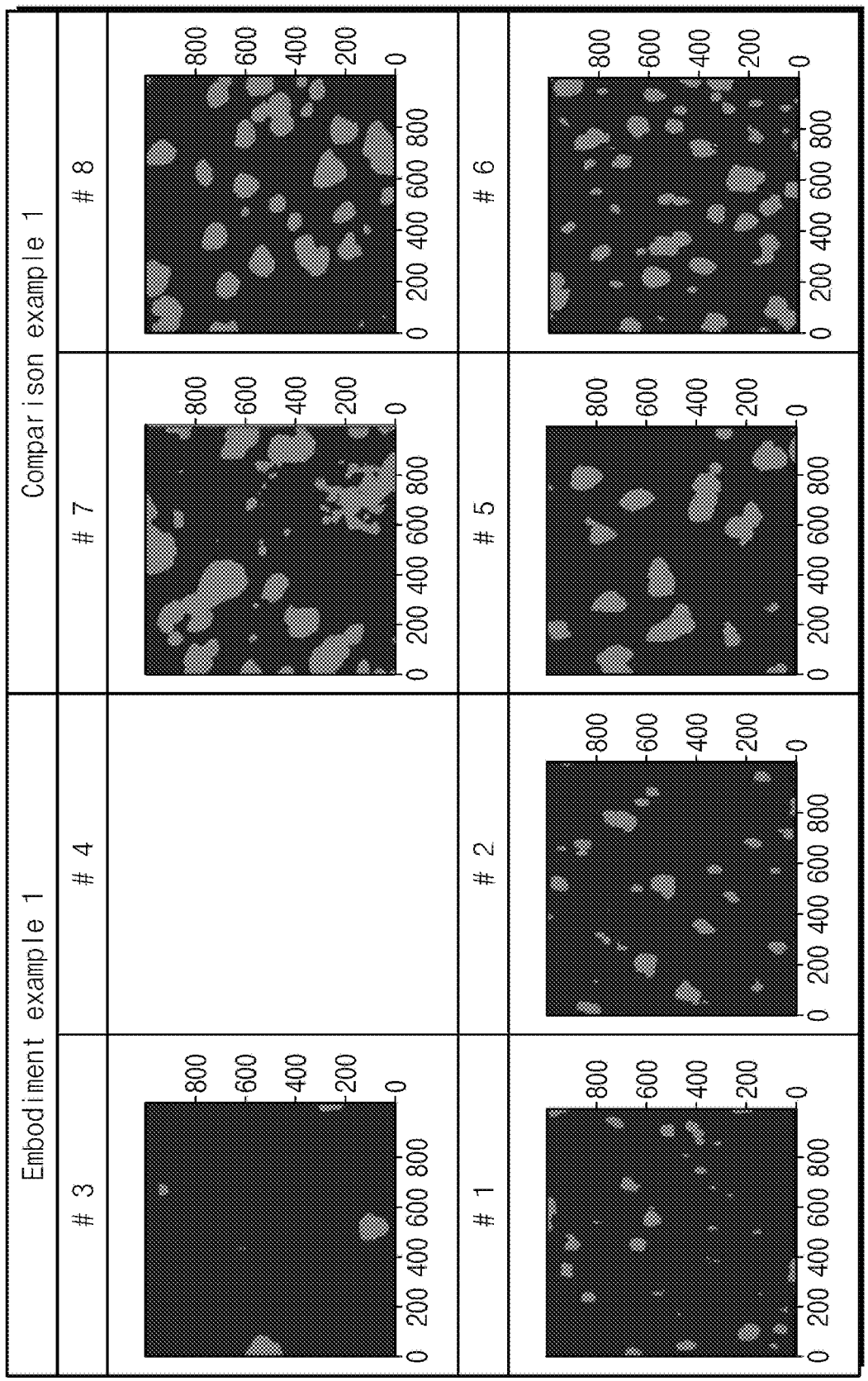
FIG. 13 is a table showing the distribution area of large-size protrusions, each having a particle size of about 30 nm or more in diameter, in the AFM images of embodiment example 1 and the comparison example 1.

On the basis of the measured AFM images, the areas in which the first large-size protrusions each having the particle size equal to or greater than about 50 nm in diameter were distributed was measured in samples #1 and #2 of embodiment example 1, and samples #5 and #6 of comparison example 1. The areas in which the second large-size protrusions each having the particle size equal to or greater than about 50 nm in diameter were distributed was measured in samples #3 and #4 of embodiment example 1 and samples #7 and #8 of comparison example 1. The measured results are shown in FIG. 13. The areas in which the first large-size protrusions or the second large-size protrusions were distributed, are indicated by a grey color. The areas in which the first large-size protrusions or the second large-size protrusions were not distributed, are indicated by a black color.

2. Measurement Results of Embodiment Example 1 and Comparison Example 1

1) AFM Analysis of the Second Large-Size Protrusions and the First Large-Size Protrusions Referring to FIG. 11, the shape, number, and distribution of the first large-size protrusions in samples #5 and #6 of comparison example 1 were similar to the shape, number, and distribution of the second large-size protrusions in samples #7 and #8 of comparison example 1. However, the number of the first large-size protrusions in samples #1 and #2 of embodiment example 1 was much higher than the number of the second large-size protrusions in samples #3 and #4 of embodiment example 1.

Referring to Table 2 and FIG. 12, the size of the distribution area of the second large-size protrusions is smaller than the size of the distribution area of the first large-size protrusions in embodiment example 1. In addition, in embodiment example 1, the size of the distribution area of the second large-size protrusions is smaller than the size of the area in which the second large-size protrusions are not distributed, and the size of the distribution area of the first large-size protrusions is smaller than the size of the area in which the first large-size protrusions are not distributed.

In embodiment example 1, values obtained by dividing the size of the distribution area of the second large-size protrusions by the size of the distribution area of the first large-size protrusions indicate 43/100, 32/100, 3/4, and 57/100.

In embodiment example 1, values obtained by dividing the size of the distribution area of the second large-size protrusions by the size of the area in which the second large-size protrusions are not distributed indicate 1/5, 17/100, 35/100, and 3/10. However, in the comparison example 1, the size of the distribution area of the first large-size protrusions is smaller than the size of the distribution area of the second large-size protrusions. In addition, in comparison example 1, the size of the distribution area of the second large-size protrusions is greater than the size of the area in which the second large-size protrusions are not distributed, and the size of the distribution area of the first large-size protrusions is smaller or greater than the size of the area in which the first large-size protrusions are not distributed.

② Analysis of distribution of the large-size protrusions each having the particle size equal to or greater than about 50 nm in diameter.

The following Table 3 shows the size of area in which the second large-size protrusions each having the particle size equal to or greater than about 50 nm are distributed in the measured AFM images, and the size of area in which the first large-size protrusions each having the particle size equal to or greater than about 50 nm are distributed in the measured AFM images. In each of the AFM images, the sum of the size of the area in which the first large-size protrusions are distributed and the size of the area in which the first large-size protrusions each are not distributed is about $1.0 \times 10^6$ nm$^2$. In addition, in each of the AFM images, the sum of the size of the area in which the second large-size protrusions are distributed and the size of the area in which the second large-size protrusions are not distributed is about $1.0 \times 10^6$ nm$^2$.

TABLE 3

| Embodiment example 1 | Size of area in which the protrusions are distributed (nm$^2$) | Size of area in which the protrusions are not distributed (nm$^2$) | Number of first or second large-size protrusions | Comparison example 1 | Size of area in which the protrusions are distributed (nm$^2$) | Size of area in which the protrusions are not distributed (nm$^2$) | Number of second or first large-size protrusions |
|---|---|---|---|---|---|---|---|
| #3 | $0.2374 \times 10^5$ | $9.7626 \times 10^5$ | 6 | #7 | $2.630 \times 10^5$ | $7.370 \times 10^5$ | 34 |
| #4 | — | — | | #8 | $2.223 \times 10^5$ | $7.777 \times 10^5$ | 33 |
| #1 | $0.5686 \times 10^5$ | $9.4314 \times 10^5$ | 37 | #5 | $1.564 \times 10^5$ | $8.436 \times 10^5$ | 19 |
| #2 | $0.7318 \times 10^5$ | $9.2682 \times 10^5$ | 32 | #6 | $1.809 \times 10^5$ | $8.191 \times 10^5$ | 51 |

Referring to Table 3 and FIG. 13, the size of the distribution area of the second large-size protrusions is smaller than the size of the distribution area of the first large-size protrusions in embodiment example 1.

In embodiment example 1, values obtained by dividing the size of the distribution area of the second large-size protrusions by the size of the distribution area of the first large-size protrusions indicate 42/100 and 32/100.

In embodiment example 1, a value obtained by dividing the size of the distribution area of the second large-size protrusions by the size of the area in which the second large-size protrusions are not distributed indicates 24/1000.

However, in the comparison example 1, the size of the distribution area of the second large-size protrusions is smaller than the size of the distribution area of the first large-size protrusions, and the size of the distribution area of the second large-size protrusions is about 3/10 or 4/10 of the size of the area in which the second large-size protrusions are not distributed.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A curved display device comprising:
a first base substrate;
a second base substrate facing the first base substrate;
a pixel electrode disposed on the first base substrate;
a common electrode disposed on the first base substrate or the second base substrate;
a first base layer disposed on the first base substrate;
a first alignment layer disposed only on the first base layer, wherein the first alignment layer comprises a reactive mesogen;
a second base layer disposed on the second base substrate;
a second alignment layer disposed on the second base layer, wherein an amount of reactive mesogen in the second alignment layer is less than an amount of the reactive mesogen in the first alignment layer; and
a liquid crystal layer disposed between the first alignment layer and the second base layer and comprising liquid crystal molecules.

2. The curved display device of claim 1, wherein the reactive mesogen comprises at least one of acrylate, methacrylate, epoxy, oxetane, vinyl ether, and styrene.

3. The curved display device of claim 1, wherein the first alignment layer further comprises a photo-initiator and derivatives thereof bonded to the reactive mesogen.

4. The curved display device of claim 3, wherein each of the photo-initiator and the derivatives of the photo-initiator comprise at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-dichloro-acetophenone, α-chloro-thioxanthone, benzoin alkylether, and derivatives thereof.

5. The curved display device of claim 1, wherein the pixel electrode is disposed on the first base substrate, the common electrode is disposed on the second base substrate, and the pixel electrode comprises a trunk portion and a plurality of branch portions protruding from and extending from the trunk portion.

6. The curved display device of claim 5, wherein the first base substrate comprises a plurality of pixel areas each comprising a plurality of domains, and the branch portions extend in different directions depending on the domains.

7. The curved display device of claim 1, wherein the liquid crystal molecules disposed in the vicinity of the first alignment layer have a pretilt angle different from a pretilt angle of the liquid crystal molecules disposed in the vicinity of the second base layer.

8. The curved display device of claim 7, wherein the pretilt angle of the liquid crystal molecules disposed in the vicinity of the first alignment layer is about 80 degrees to about 90 degrees.

9. The curved display device of claim 8, wherein the pretilt angle of the liquid crystal molecules disposed in the vicinity of the second base layer is about 88 degrees to about 90 degrees.

10. The curved display device of claim 1, wherein each of the first and the second base substrates are curved.

11. A curved display device comprising:
a curved first substrate;
a curved second substrate facing the first substrate; and
a liquid crystal layer provided between the first substrate and the second substrate, wherein the liquid crystal layer comprises liquid crystal molecules, wherein the first substrate comprises a first base substrate and a first alignment layer provided between the first base substrate and the liquid crystal layer, wherein the first alignment layer comprises reactive mesogens polymerized to each other;

wherein the second substrate comprises a second base substrate and a second alignment layer provided between the second base substrate and the liquid crystal layer;

wherein first liquid crystal molecules disposed in the vicinity of the first alignment layer have a first pretilt angle and second liquid crystal molecules disposed in the vicinity of the second alignment layer have a second pretilt angle different from the first pretilt angle, wherein an average value of the first pretilt angle is less than an average value of the second pretilt angle, and wherein an amount of reactive mesogen in the second alignment layer is less than an amount of the reactive mesogen in the first alignment layer.

12. The curved display device of claim 11, wherein the first substrate has a first radius of curvature and the second substrate has a second radius of curvature different from the first radius of curvature.

13. The curved display device of claim 11, wherein the first substrate further comprises a pixel electrode disposed on the first base substrate, and the second substrate further comprises a common electrode disposed on the second substrate and facing the pixel electrode.

14. The curved display device of claim 13, wherein the pixel electrode comprises a trunk portion and a plurality of branch portions extending from the trunk portion.

15. The curved display device of claim 14, wherein the pixel electrode comprises a plurality of domains in which the extending directions of the branch portions are different from each other with respect to the trunk portion.

16. The curved display device of claim 14, wherein the branch portions in each domain extend in a direction substantially parallel to each other.

17. The curved display device of claim 16, wherein the plurality of domains comprises a first domain, a second domain, a third domain, and a fourth domain.

18. The curved display device of claim 11, further comprising:
a first polarizing plate disposed under the first substrate and having a first transmission axis; and
a second polarizing plate disposed above the second substrate and having a second transmission axis, wherein the first transmission axis is substantially perpendicular to the second transmission axis.

19. A curved display device comprising:
a curved first base substrate;
a first alignment layer comprising a first base layer disposed on the curved first base substrate and a plurality of first protrusions disposed on the first base layer;
a curved second base substrate facing the first substrate; and
a second alignment layer comprising a second base layer disposed on the second base substrate and a plurality of second protrusions disposed on the second base layer,
wherein the first protrusions comprise first large-size protrusions each having a particle size equal to or greater than about 30 nm and equal to or less than about 1000 nm in diameter, and wherein the second protrusions comprise second large-size protrusions each having a particle size equal to or greater than about 30 nm and equal to or less than about 1000 nm in diameter, wherein the first base layer comprises a first overlap area overlapping the first large-size protrusions, and a first non-overlap area not overlapping the first large-size protrusions, wherein the second base layer comprises a second overlap area overlapping the second large-size protrusions, and a second non-overlap area not overlapping the second large-size protrusions, wherein the first large-size protrusions and the second large-size protrusions comprise reactive mesogens polymerized to each other, and wherein the first and second overlap areas satisfy Equation 1

$$0 < \text{area of the second overlap area}/\text{area of the first overlap area} \leq 4/5 \quad \text{Equation 1.}$$

20. The curved display device of claim 19, wherein a number of the second large-size protrusions is less than a number of the first large-size protrusions.

21. The curved display device of claim 19, wherein the area of the second overlap area is less than an area of the second non-overlap area.

22. The curved display device of claim 19, wherein the second overlap area and the second non-overlap area satisfy Equation 2

$$0 < \text{area of the second overlap area}/\text{area of the second non-overlap area} \leq 5/10 \quad \text{Equation 2.}$$

23. The curved display device of claim 19, wherein the area of the first overlap area is equal to or greater than about $3.0 \times 10^5$ nm$^2$ and equal to or less than about $1.0 \times 10^6$ nm$^2$ and a unit area of a surface of the first base layer is about $1.0 \times 10^6$ nm$^2$.

24. The curved display device of claim 19, wherein the area of the second overlap area is greater than 0 nm$^2$ and equal to or less than about $3.5 \times 10^5$ nm$^2$ and to a unit area of a surface of the second base layer is about $1.0 \times 10^6$ nm$^2$.

25. A curved display device comprising:
a curved first base substrate;
a first alignment layer comprising a first base layer disposed on the first base substrate and a plurality of first protrusions disposed on the first base layer;
a curved second base substrate facing the first substrate; and
a second alignment layer comprising a second base layer disposed on the second base substrate and a plurality of second protrusions disposed on the second base layer,
wherein the first protrusions comprise first large-size protrusions each having a particle size equal to or greater than about 50 nm and equal to or less than about 1000 nm in diameter, and wherein the second protrusions comprise second large-size protrusions each having a particle size equal to or greater than about 50 nm and equal to or less than about 1000 nm in diameter, wherein the first large-size protrusions and the second large-size protrusions comprise reactive mesogens polymerized to each other, wherein the first base layer comprises a first overlap area overlapping the first large-size protrusions and a first non-overlap area not overlapping the first large-size protrusions, wherein the second base layer comprises a second overlap area overlapping the second large-size protrusions and a second non-overlap area not overlapping the second large-size protrusions, and wherein the first and second overlap areas satisfy Equation 3

0<area of the second overlap area/area of the first overlap area≤1/2  Equation 3.

26. The curved display device of claim 25, wherein a number of the second large-size protrusions is less than a number of the first large-size protrusions.

27. The curved display device of claim 25, wherein the second overlap area and the second non-overlap area satisfy Equation 4

0<area of the second overlap area/area of the second non-overlap area≤1/10  Equation 4.

28. The curved display device of claim 25, wherein the area of the first overlap area is equal to or greater than about $0.4 \times 10^6$ nm$^2$ and equal to or less than about $1.0 \times 10^6$ nm$^2$ and a unit area of a surface of the first base layer about $1.0 \times 10^6$ nm$^2$.

29. The curved display device of claim 25, wherein the area of the second overlap area is greater than 0 nm$^2$ and equal to or less than about $0.3 \times 10^5$ nm$^2$ and a unit area of a surface of the second base layer is about $1.0 \times 10^6$ nm$^2$.

30. A curved display device comprising:
a curved first substrate;
a first alignment layer disposed on the first substrate;
a curved second substrate facing the first substrate; and
a second alignment layer disposed on the second substrate and facing the first alignment layer,
wherein the first alignment layer comprises:
a first base layer;
a photo-initiator; and
reactive mesogens polymerized each other, and
wherein the first alignment layer comprises at least one compound having a structure represented by following Chemical formulas 1 and 2

Chemical formula 1

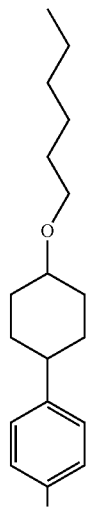
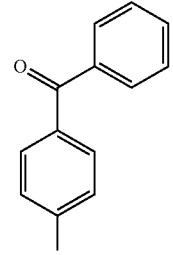
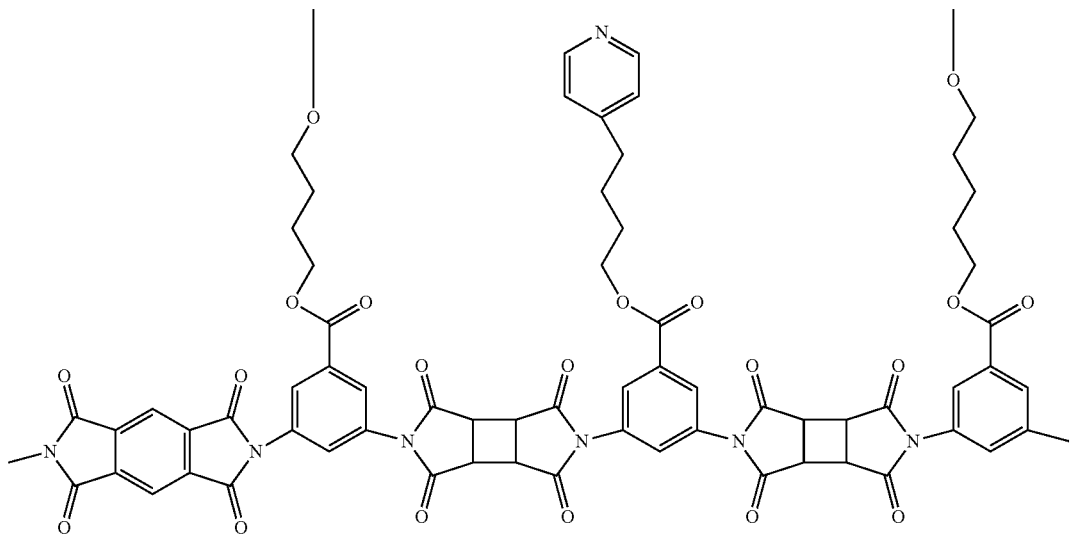

-continued

Chemical formula 2

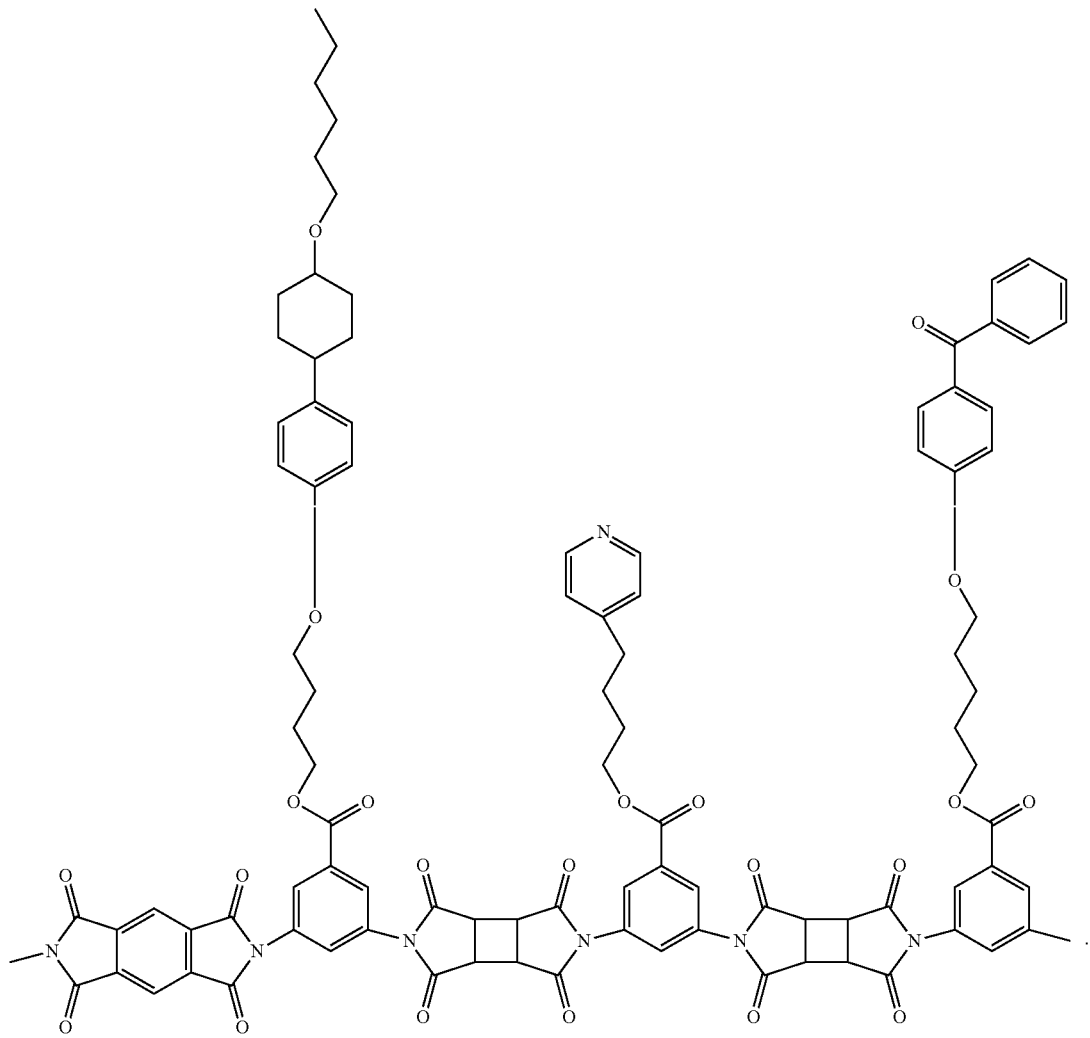

31. The curved display device of claim 30, wherein the second alignment layer is not polymerized to the photo-initiator.

32. The curved display device of claim 30, wherein the photo-initiator comprises at least one of benzyl dimethyl ketal, α-hydroxyketone, methylbenzoylformate, acylphosphine oxide, titanocene, α-aminoketone, α-aminoacetophenone, oxime ester, benzophenone, phenylketone, α-di-chloro-acetophenone, α-chloro-thioxanthone, benzoin alkylether, and derivatives thereof.

33. The curved display device of claim 30, wherein each of the reactive mesogens comprises at least one of acrylate, methacrylate, epoxy, oxetane, vinyl ether, styrene, and derivatives thereof.

34. The curved display device of claim 30, wherein the compound having a structure represented by Chemical formula 1 is present on a surface of the first alignment layer in an amount greater than a compound having the structure represented by Chemical formula 2.

35. The curved display device of claim 1, wherein the second alignment forming layer does not comprise reactive mesogen.

36. The curved display device of claim 11, wherein the first pretilt angle is about 80 degrees to about 90 degrees.

37. The curved display device of claim 11, wherein the second pretilt angle is about 88 degrees to about 90 degrees.

* * * * *